(12) United States Patent
Cooper

(10) Patent No.: US 9,820,137 B2
(45) Date of Patent: *Nov. 14, 2017

(54) LOCATION-BASED, RADIO-DEVICE IDENTIFICATION APPARATUS AND METHOD

(71) Applicant: J. Carl Cooper, Reno, NV (US)

(72) Inventor: J. Carl Cooper, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/456,012

(22) Filed: Mar. 10, 2017

(65) Prior Publication Data

US 2017/0188222 A1    Jun. 29, 2017

Related U.S. Application Data

(63) Continuation-in-part of application No. 13/890,077, filed on May 8, 2013, now Pat. No. 9,648,482.

(51) Int. Cl.
| | |
|---|---|
| *H04W 8/00* | (2009.01) |
| *H04W 24/08* | (2009.01) |
| *H04B 1/08* | (2006.01) |
| *H04H 60/25* | (2008.01) |
| *H04H 60/43* | (2008.01) |

(52) U.S. Cl.
CPC ............ *H04W 8/005* (2013.01); *H04B 1/082* (2013.01); *H04H 60/25* (2013.01); *H04H 60/43* (2013.01); *H04W 24/08* (2013.01)

(58) Field of Classification Search
CPC .......... H04W 4/02; H04W 4/06; H04W 4/04; H04W 24/08; H04W 48/16; H04W 8/005; H04H 60/27; H04H 2201/13; H04H 60/25; H04H 60/54; G01S 5/0027

See application file for complete search history.

(56) References Cited

U.S. PATENT DOCUMENTS

| | | |
|---|---|---|
| 6,664,945 B1 | 12/2003 | Gyde |
| 6,865,379 B1 | 3/2005 | Liebenow |
| 7,996,018 B1 | 8/2011 | Fan |
| 8,194,573 B1 | 6/2012 | Smith |
| 2002/0009994 A1 | 1/2002 | Sample |
| 2002/0183059 A1 | 12/2002 | Noreen et al. |
| 2003/0040272 A1 | 2/2003 | Lelievre et al. |
| 2003/0165114 A1 | 9/2003 | Kusama et al. |
| 2004/0166862 A1 | 8/2004 | Voyer |
| 2004/0177085 A1 | 9/2004 | Rappaport et al. |
| 2007/0142945 A1 | 6/2007 | Beckmenn et al. |
| 2007/0260364 A1 | 11/2007 | Dwyer |
| 2008/0057891 A1 | 3/2008 | Klunk |
| 2010/0076576 A1 | 3/2010 | Lee et al. |
| 2010/0151809 A1 | 6/2010 | Jaisimha et al. |

*Primary Examiner* — Devan Sandiford

(57) ABSTRACT

An apparatus and method is disclosed to receive location data identifying the current location of a vehicle. A database, storing radio device records, is then queried. Each radio device record in the database identifies a radio device (e.g., a transmitter, receiver, transceiver, transponders, etc.) and a location of the radio device using a suitable coordinate system. Radio device records associated with radio devices likely to be within communication range of the vehicle may then be retrieved from the database. These radio device records may be used to generate a radio device list that may be presented to an occupant of the vehicle.

27 Claims, 6 Drawing Sheets

LOCATION-BASED, RADIO-DEVICE IDENTIFICATION APPARATUS AND METHOD

CROSS-REFERENCE TO RELATED APPLICATIONS

This application is a continuation in part of application Ser. No. 13/890,077 filed May 8, 2013 and allowed on Feb. 10, 2017, which application is incorporated herein by reference.

BACKGROUND OF THE INVENTION

Field of the Invention

This invention relates to communicating information (e.g., images, music, speech, text, data and other intelligent information). More particularly the invention will find use with a communications device which may incorporate or benefit from apparatus and/or methods for identifying other communications devices which are available for communicating such information therewith. In this respect, the present invention recognizes that it is desirable for a first communications device to communicate with one or more other communications devices which are sometimes referred to herein as radio devices (even though they may communicate without use of radio waves or with combinations of technologies) without impairment of communications and in particular to identify when such communications would be undesirably impaired, that is, the transfer or conveyance of intelligent information is prevented, diminished, reduced, weakened, lessened, decreased, hindered, slowed, degraded, and the like.

In particular, in one embodiment of the invention a first communications device incorporates apparatus and/or methods such that it operates to determine if another communications device may or may not be available for communicating without, or with impairments to such communications. These impairments may for example occur or change with time, both due to changes in location of one or both of the first and other communications devices relative to an obstruction, or due to temporal changes affecting one or more particular impairment, for example impairments from Earth and Space weather e.g. atmospheric and solar storms. In one aspect of the invention it is desired that estimates and/or predictions (of various possible) impairments which could affect communications between the first communications device and the other communications device(s) be made.

By communicating without impairment, it is meant that the communications are of substantially the same quality as if the communications were not subject to any of the impairment factors which are taken into account when making the impairment determination. It will be seen from the teachings of the preferred embodiment of the invention that it is desired to make the impairment determination, or estimate the amount of impairment, before attempting such communications or otherwise without attempting such communications. In an embodiment of the invention a determination of no, or an acceptable amount of impairment is made and then such communications is attempted and if an unacceptable amount of impairment is determined no communications is attempted. By making the impairment determination first, efforts to communicate with devices with little or no likelihood of successful communications may be avoided.

In the particular example of the preferred embodiment of the invention, impairments may occur due to the locations of geographic features for example such as mountains and/or movement of the first and/or the other communications device. In particular, for an aircraft line of sight communications which will be discussed by example therewith, such relative location and/or movement may cause obstructions to partially or fully block that line of sight. The invention will find particular usefulness in the field of mobile wireless communications where communications may be impaired, including for example to the point of preventing the transfer or conveyance of information with no, or an acceptable level of impairment.

It is noted at this point that as used herein, communicate is defined as the transfer or conveyance of intelligent information and does not include the mere transmission, reception or presence of energy without such transfer or conveyance. Wireless communications is defined as communications through the ether (including space, atmosphere, water and terra firma) such as via electromagnetic, optical and/or acoustical energy or quantum technology and is intended to encompass such communications even if a metallic or other conductive antenna or the like is utilized. Also, as used herein, connected communications is defined as meaning via connection using a solid physical thing, e.g., metallic wire, metallic waveguides, optical fiber, optical waveguides and other known connection technologies including quantum communications over optical fiber or metallic conductors. Wired communications is defined as using metallic or non-metallic conductors of electrons, photons or waves such as drawn, rolled or cast metallic or non-metallic threads, wires, rods, tubes, pipes, waveguides and the like including traditional insulated metal wire, cable and fiber optics.

Additionally, while the preferred embodiment will be described herein substantially in respect to the particular usefulness in wireless communications, the invention will also be adaptable to, and useful for, connected and wired communications as will be understood to the person of ordinary skill in the art from the teachings herein. In another embodiment, the invention will find use in recognizing when communications between a plurality of devices, one or both of which may from time to time change its location, may be substantially impaired or even not possible due to one or more impairment factors, e.g., things, elements, characteristics, effects and the like, which cause or contribute to impairment of the desired communications, as discussed further herein. Predictions of such impairment or lack thereof may also be made and in particular in respect to the preferred embodiment such predictions are preferred to be made in response to the location of obstructions. Alternatively, while generally described below in respect to the location of obstructions, such predictions of impairment may be also be made in response to the location of impairments and the occurrence or predicted occurrence of impairments, e.g. thunderstorms impairing aviation RADAR and other communications over a relatively short term or sunspots and solar flares impairing communications over a longer term. As an example, an 11 year sunspot cycle may be used for prediction of impairment.

As used herein, obstructions include, but are not limited to, physical things like mountain ranges or individual mountains which obstruct line of sight communications by blocking the propagation of energy used for the communications. It will be recognized however that obstructions (unless a specific type is named or described) will include any physical or non-physical things, characteristics, activities, processes, effects or the like, which causes undesired impairment to the communications. As just one specific example, Rayleigh fading is a well-known effect occurring in a propagation environment in the transmission of radio signals which effect can cause impairment to that communication. Rayleigh fading is considered herein to be an obstruction even though it is not a physical thing (although it often occurs in connection with a physical thing such as a reflector). As another example, heavy precipitation in thunderstorms may impair aircraft communications and in particular RADAR, Solar flares and sunspots (which are often related) may impair radio frequency communications.

Related Art

Some prior art radio receivers which incorporate signal strength displays are known (e.g., signal strength meter on a radio receiver or bars on a cell phone). As cell phone users come to understand, a shortcoming of this type of display is that the presence of several bars on the signal strength display is no guarantee that calls can be placed or received, particularly in densely populated areas such as sports arenas. The presence of only a few bars is not always an indication that it is impossible to place or receive calls, particularly at sparsely populated areas with a clear line of sight to a cell tower. Other factors can affect communications, some of which factors are not taken into account by the signal strength display, These prior art signal strength devices may be improved by incorporation of the present invention.

As another prior art example, radio devices may incorporate scanners which attempt to determine the presence of other desired radio devices by scanning for radio frequency energy at particular frequencies. This scanning is in one respect and attempt to receive energy, but receiving such energy does not create communications as defined herein. Nor do such devices make any determination of from where, or from what, that energy comes. The energy present at a particular frequency may or may not originate with a desired radio device, it might for example be from some non-communications device or harmonic interference from an unwanted communications device. The energy may originate with a wanted device, but is received during a short time frame because of various factors (e.g., temporary reflection from an aircraft) or the wanted device signal is blocked (e.g., by temporary interference) and no information as to where the wanted device is located, its distance, direction or altitude is determined.

As another example, a user or user's radio device may for example cause the FM broadcast spectrum to be scanned when the radio receiver is at a given location. The radio receiver stores a list of those frequencies which had energy present during the scan. A shortcoming of this system is that even though energy was available when the scan was performed it does not guarantee that a station at that frequency will be available at a later time. Similarly, the absence of energy when the scan was performed does not prevent later availability. Such prior art scanner devices may be improved by incorporation of the present invention.

Prior art automobile broadcast entertainment radios often include favorite station memories which may be programmed by an operator such that a particular favorite broadcast station may be selected by simply pushing a button. These radios often include several sets of such memories, allowing an operator to manually select a set of stations for each location where a driver travels and thereby select the stations associated with that set. Drivers who commute to different cities may manually program these sets to include favorite stations associated with each such city by listening to a station, deciding it is one to be programmed and manually storing it in that memory. It is also well known that the driver can cause the automobile radio to scan, up or down the particular broadcast spectrum, for broadcast stations which can be received. The scan can either stop on the first station that is received, or can scan, one by one, to stations which can be received, pausing at each station for a few seconds to allow the driver to listen. The one by one scanning continues until the driver causes the scan to stop on that station during the pause.

It is well known however that broadcast entertainment radio stations, be they AM, FM, Satellite or others, will all experience dead spot locations where they cannot be received by a particular radio. For example, broadcast radio station reception may be blocked by buildings, tunnels, overhead traffic signals, street lights and power lines. There is no guarantee that a preset station can be received by these prior art automobile broadcast entertainment radios for any of several reasons, including that the driver forgets to change the set when driving from one city to the other and that the vehicle is stopped in or moving through a dead spot. Such prior art automobile entertainment radio devices may be improved by incorporation of the present invention.

In the prior art devices described above, where bad or good reception is indicated by some energy presence or strength (such as cell phone bars or scanners detecting energy), permanent and temporary factors such as reflections, interference, obstacles, lack of channel availability, movement and others as will be known from the teachings herein are not taken into account by the indication. In devices where a radio station was or wasn't available at a first scanning time but that information is no longer accurate, or where a radio station should not be received but is, or should be received but is not, as with those prior art radios described herein, and other factors such as moving signal reflectors, moving obstacles and/or moving radio devices may facilitate or interfere with communications. These factors are not taken into account by the prior art device mechanism which indicates availability.

Impairment factors (or lack thereof) and other reasons which cause a prior art radio device to not be able to communicate with another radio device which would otherwise be available, or cause it to be able to communicate with another radio device which would otherwise not be available, is not determined or known from the operation of the prior art radio device, or conveyed to the operator. The operation of those prior art radio devices only determines that a station on a particular broadcast frequency is or is not being received at a particular moment time when located at that particular location. Only that information is determined. No information about impairment or impairment factors or predicted or future impairment or factors (or lack thereof) is conveyed to the user.

BRIEF SUMMARY OF THE INVENTION

A first object of the present invention is determining the present and/or future ability of a first communications device to wirelessly communicate with one or more other communications device without unacceptable impairment, determined based on one or more impairment factors which cause or relate to the (potential or actual, present or future) impairment. For example, communications impairment(s) may range from distortions, noise and/or errors in the communicated information, to a total inability to communicate. Impairment factors may include the relative locations of communications device(s) which affect the path (or paths when more than one is potentially available) the wireless communications take between devices, orientation or bearing of one or more of the devices, and/or obstructions and/or areas of impairment, which may be located in, near or are otherwise related to such path(s). A second object of the invention is that when determining impairment, locations may be taken into account in respect to two (e.g., two of latitude, longitude and altitude) or three (e.g., latitude, longitude and altitude) dimensions as will be discussed herein. Other objects include use of impairment factors, for example characteristics of the communication devices such as the communications technology and/or communications frequency being used, may be utilized or otherwise taken into account. Details thereof as well as other impairment factors and impairment information will be known to the person of ordinary skill in the art from the teachings herein.

The utilization of impairment information and/or factors to facilitate safe vehicle operation, as well as for operator and/or user convenience, are objects of the invention. It will be appreciated that another object of the invention is making impairment information and/or factors, available to one or more user(s) of one or more communications devices. This is particularly true when the devices convey important information to or between one or more user, and one or more of those devices is tethered, mobile, portable or otherwise not stationary. The user(s) may benefit from use of the invention for one or more of the same advantages described herein with respect to use by a vehicle operator.

Still another object of the invention is making impairment information and/or factors available to a portable wireless communications device, or a user who carries about (e.g., without operating a vehicle) a wirelessly connected portable communications device including those such as a cell phone, and/or other portable electronic device such as computing devices which are similarly wirelessly connected. Other objects of the invention include making communications impairment information and/or factors available to a user who communicates (with a portable or stationary device) with such portable devices carried by or otherwise associated with a vehicle.

Yet other objects of the invention include providing more accurate information to a communications device user as to the timely ability to communicate with or without impairment. Here timely ability includes not only the present, but may be time in the future, such as by predicting, including estimating or calculating, when a remotely located communications device may or will become available for communications, and/or when it may or will no longer be available. An additional object of the invention is providing information as to why there may or may not be impairment and/or to suggest how to avoid or reduce impairment. The user may utilize part or all of the herein described information to assist in timely obtaining reliable communications. Further objects, advantages, capabilities and uses of the invention will be apparent to the person of ordinary skill in the art from the teachings below.

BRIEF DESCRIPTION OF THE DRAWINGS

That the invention's advantages will be readily understood, particular descriptions will be given by reference to examples illustrated in the appended drawings. Understanding that these drawings depict only typical examples of the invention and are not to be considered limiting of its scope, the invention will be described and explained with additional specificity and detail through the use of the drawings, in which.

DETAILED DESCRIPTION OF THE INVENTION

Figure 1:
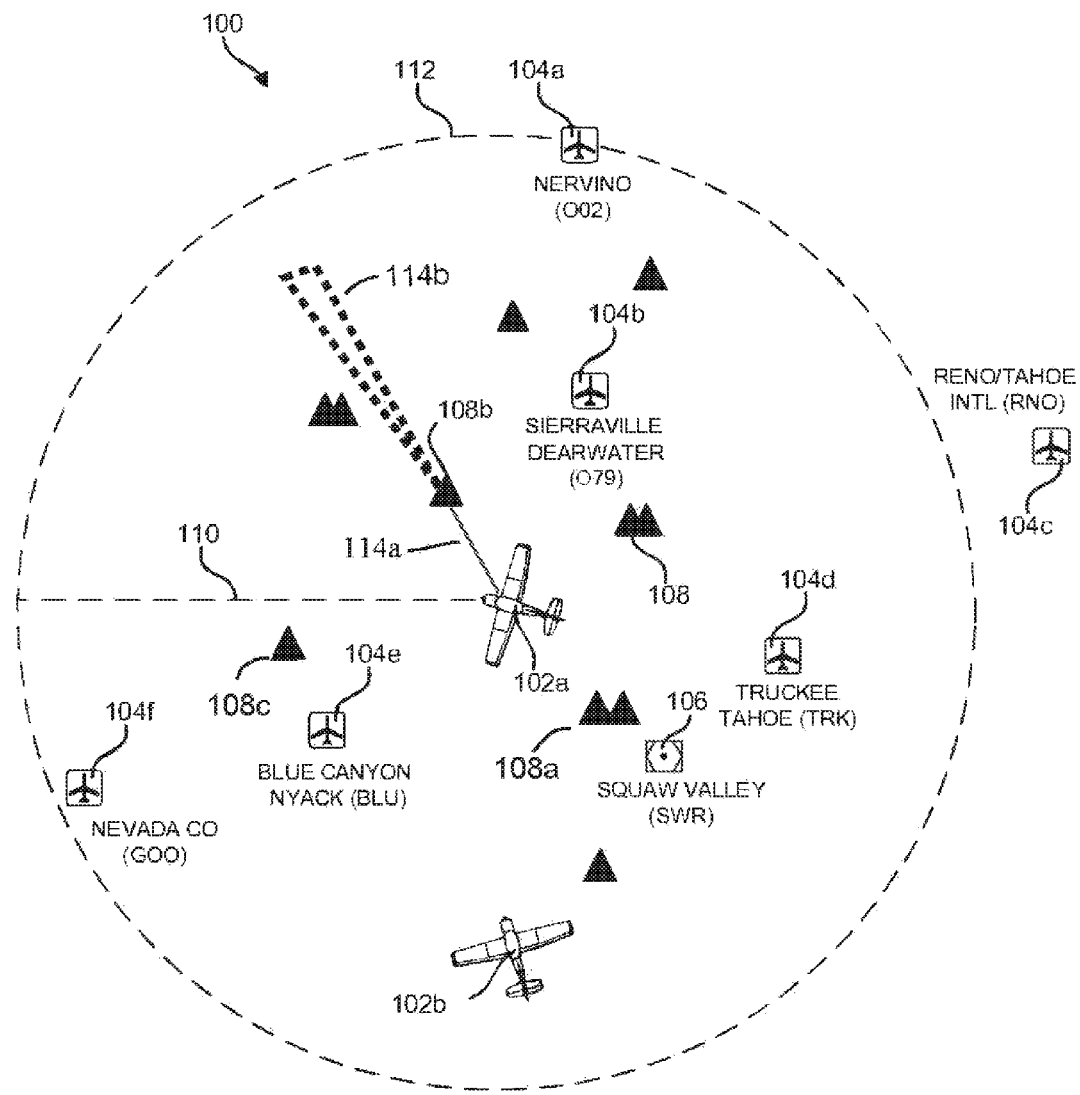
FIG. 1 is a high-level map showing two aircraft and several airports, all having radio devices associated therewith.

FIG. 1 shows by way of example a map 100 (simplified and not to scale for purposes of explanation) of an area in which two aircraft 102 are flying. North is at the top. Elements 114*a* and 114*b* will be described below and will not be initially described here. The area has several airports 104, communications obstructions 108, in this instance mountains, a navigation aid the Squaw Valley VOR 106 which transmits a continuous navigation signal. Locations, for example those of obstructions and fixed communications devices are preferred to be stored for recall, for example in a database or map as will be discussed further below. It will be understood for purposes of this example that each airport 104 has associated with it at least one radio station for various types of communications with aircraft. FIG. 1 also shows a calculated range 112 in which the communications and navigation radios in aircraft 102*a*, flying at a given altitude, for example 10,000 feet, can be expected to communicate with ground located radios such as those located at airports 104 and the VOR 106. The calculated range 112 does not take into account obstructions such as the mountains 108 which can block the line of sight communications, areas of communications impairment or the altitude of the various ground radios. It is noted here that altitude may be in mean sea level (MSL) form meaning the altitude above sea level, or above ground level (AGL) for. One may be converted to the other if the ground elevation at the point is known. Another altitude, flight level is commonly used, being the altitude shown on a pressure altimeter which is adjusted to a standard pressure setting. Flight levels will not be utilized herein.

Each of the communications devices has one or more associated location, range and altitude at which communications is expected to be reliable. This information can be stored in the database. For example, there are three classes of VORs, T (terminal), L (low altitude) and H (high altitude). The T type can be received from 1000 feet up to 12,000 feet altitude above ground level (AGL) and 25 nautical miles (NM) distance and the L type to 18,000 feet and 40 NM. The H type is somewhat more complicated having different altitude and range combinations: (1) up to 14,500 feet AGL out to 40 NM; (2) 14,500 AGL up to 18,000 feet to 100 NM; (3) 18,000 feet AGL up to 45,000 feet AGL out to 130 NM; and (4) 45,000 feet AGL up to 60,000 feet out to 100 NM. The Squaw Valley VOR is an L type, located on the top of a mountain at approximately 9,000 feet and can be received from 1,000 to 18,000 feet to at least 40 NM away. By contrast, the Reno/Tahoe airport is located in a valley at 4,400 feet surrounded by mountains above 8,000 feet. Radios actually located on the airport have a limited range because of those surrounding mountains. Those mountains are not shown on FIG. 1 for simplification.

The first aircraft 102a contains a plurality of communications (com) radios for talking and a plurality of navigations (nav) radios for receiving navigation data. A radio which receives the SWR VOR is a nav radio. The aircraft attempts to fly along a desired flight path 110 having a bearing (direction) which in this case is (true as compared to magnetic) due west. The aircraft heading (the direction the nose points) is not the same as its desired flight path because of the effect of a wind from the north (top of map). The aircraft might not actually fly the desired flight path due to wind variations. Such variations often require constant adjustment of the heading to achieve the desired flight path, giving rise to need for an autopilot to assist the pilot in keeping to the desired flight path.

The corn radios are capable of bidirectional (two way) communications via a single radio channel (or a plurality of radio channels) as is known in the art. For example, the pilot of aircraft 102a may use one of the corn radios to communicate with the pilot of aircraft 102b. The nav radios are capable only of one way or unidirectional communications, also as known in the art. For example, the pilot of aircraft 102a may use a nav radio to receive the continuous navigation broadcast from Squaw Valley VOR 106, but the nav radio is incapable of transmitting to 106 or any other radio. Accordingly, the pilot both operates (flies) the aircraft and uses the radios to facilitate such flight. Alternatively, the pilot may allow an autopilot to operate (fly) the aircraft. Further, the pilot may not even be in the aircraft but remotely flying the aircraft with or without the aid of an autopilot as in well-known drone operation.

Making communications impairment information available to an operator of a vehicle (which incorporates or is otherwise associated with a communications device) so that the operator is able to quickly act on that information and in particular to act in a manner which facilitates the safe operation of the vehicle in part as a result having communications impairment information available when needed, is an object of the present invention. For example, with respect to FIG. 1, it is important that the pilot of aircraft 102b be able to avoid a collision with aircraft 102a, particularly when flying in instrument conditions when neither can see the other from any appreciable distance. Here communications accuracy and speed is vitally important.

Neither pilot wants to be delayed in determining their position using a GPS or VOR, or delayed in communicating with the airspace controller or other pilot to ensure that they are not on a collision path. An object of the instant invention is to provide communications impairment information, or lack thereof, to the operator or user in order to facilitate such communications, whether the communications are manually attempted by the user or automatically presented to the user. For example, if the FIG. 1 pilot of either aircraft 102 needs to communicate, the invention can automatically provide the pilot with a list of remote radio devices which are actually available at that time to help reduce pilot delays and errors and facilitate selecting an appropriate radio to communicate with. It will also be useful to provide the pilot with a warning that a particular radio, even one which is automatically presented as being otherwise available for selection, is not available.

Before proceeding, in order to facilitate full understanding of the invention it will be useful to further explain, define and give examples for, various terms which are utilized herein.

Communicate, communication and other various forms thereof is used herein to mean the transfer or conveyance of more than a de minimis quantity of intelligent information. In particular, as used herein, including such transfer or conveyance between a plurality of communications devices. In referring to communications, it will be understood that such may include: unidirectional, e.g. one-way communications, that is, only receiving (or sending) information from one or more device at a time as in receiving a radio broadcast; simplex bidirectional, e.g. two-way communications where devices take turns receiving from the other(s) as in a two-way radio conversation which frequently take place on a single frequency (channel); duplex bidirectional, e.g. two-way communications where each device can simultaneously send to and received from the other as in communications via a plurality of channels; and/or near simultaneous communications between multiple devices e.g. networked communications utilizing various gateways, servers, protocols and the like. Communications may be point to point or any of the numerous types of networking technologies which are known to, or become known to the person of ordinary skill in the art from the teachings herein in order to achieve a desired level of capability.

Of particular interest is drone operation wherein a pilot communicates with the aircraft being flown via one or more radios, and may remotely operate those radios located in the aircraft to receive information therefrom as well as to communicate with other radios, for example to communicate with other radio devices such as those shown by example in FIG. 1, and to receive GPS information from a GPS radio located in the aircraft permitting the pilot to know the aircraft's location with good accuracy as the aircraft travels.

Location as used herein refers to a point in space relative to the Earth's surface, including points on, above or below the Earth's surface. Location may be expressed relative to a defined point on the Earth's surface (herein a spatial location) such as the fictional null island, or relative to some other point in space which may or may not be on the surface, such as the location of one or more radio devices (also referred to as relative location), including if desired the Deep Space Network (DSN). Location, (when used without spatial or relative qualification) will encompass both unless it is otherwise clear from the context. GPS coordinates in particular use latitude and longitude, which reference the null island at the intersection of the Equator and the Prime Meridian. The intersection, and hence the null island, is defined as zero degrees latitude and zero degrees longitude.

Locations as used in respect to the instant invention may be expressed, identified and/or stored using any suitable coordinate system, for example such as Cartesian, polar, cylindrical, spherical and homogeneous which may be mixed as desired. Locations, directions, headings and bearings may be expressed using or including either the true or magnetic cardinal point system, or degrees of latitude and longitude or any other suitable system. The chosen system need not be uniformly used and different systems may be used. For example, a radio device location may be stored as latitude, longitude and altitude, but identified on a display to the operator as direction (bearing) and distance (and if desired altitude) relative to one or more of a vehicle's location, orientation and bearing.

For clarity, as discussed in more detail below, operator, as used herein, is meant to mean the human or non-human operator of a vehicle and/or communications device(s). An operator may or may not be physically located with the vehicle and there may be more than one operator, for example a mechanical autopilot and a human pilot. An operator may benefit from the information provided by the instant invention. User, as used herein, is meant to mean human (and only human) user of a communications device, unless specifically stated otherwise. A user may or may not be physically located with the communications device or a vehicle. A user may also benefit from the information provided by the instant invention. A human operator may also be a user when operating a communications device. A user may also be an operator of a vehicle.

Operator and user may be described with respect to the particular type (e.g. human) and/or particular device being used or operated, for example such as radio user or operator, or an aircraft radio user or operator, thus meaning human or non-human operator thereof. Or, a human or non-human operator or user thereof may be specified. In those instances, the description is meant to be limiting, for example an aircraft radio user, which means a human who is using an aircraft radio device. This would not encompass a non-human, or a non-aircraft radio or non-radio device, although the user is not limited to local use or remote use.

It will be understood and appreciated that while the invention may be utilized with or by human and non-human users and operators, the distinction is not a trivial one and the transition of use from one to the other involves considerable and non-trivial changes. As just one example, consider the many differences and difficulties in human and non-human operation of an automobile. Nevertheless, it will be understood that the instant invention may be adapted to either human or non-human use without undue experimentation, particularly by those of ordinary skill in the particular art, as will be known from the teachings herein.

The wording, terms, phrases, descriptions and the like used herein in the specification, including the drawing and claims are intended to have the plain and ordinary meaning to the person of ordinary skill in the art to which the invention of the claim pertains, as will be known from the teachings herein. The teachings including scope of the invention described in the specification as well as the advantages and distinctions of the invention which in turn help to define the scope of the claim. It is intended that teachings of the specification as well as the interpretation of the claims take into account expressly defined terms of the invention and expressly disavowed scope of the invention. It is intended that the claims not be divorced from the specification or construed in an unreasonably broad manner and that the interpretation reasonably reflects the plain language of the specification including the advantages and distinctions of the invention, as would be known to the person of ordinary skill in the art.

Applicant here sets forth the person of ordinary skill in the art to which the claimed invention pertains as a person possessing a four year degree in electrical (sometimes referred to as electronics) engineering from an accredited U.S. college or university, the study for which degree includes classes in: physics, advanced electrical theory, analog circuit design at the transistor level and higher, digital circuit design at the gate level and higher, Boolean logic, wireless transmitters and receivers, wireless radio frequency devices operating in the MF (300 kHz) through mid EHF bands (100 GHz), radio frequency modulation and demodulation techniques, mobile communications with line-of-sight propagation radio frequencies and communication theory (e.g., Shannon, Nyquist). Additionally, the person would have four or more years of hands on experience in the design of or installation, troubleshooting and/or repair of line-of-sight radio frequency communications equipment and systems.

As used herein vehicle is intended to mean the thing used for transporting people, goods or cargo or to movably provide services (e.g., communications, surveillance or images) in space, air, on land or in or under water. Vehicle operation is intended to primarily pertain to the safe movement of the vehicle, but it will be recognized that as part of that movement the safe operation of vehicle systems, equipment and the like are necessary in order to ensure safe operation, even when the vehicle is not moving.

For example, systems and devices such as automatic speed controls, directional controls (in one or more dimensions or axes), autopilots, motive power sources, and similar total and partial vehicle operation apparatus whether located in or about the vehicle or remotely are systems which pertain to operation, which systems themselves require safe operation as part of the vehicle operation. As simple examples, rotorcraft require a working engine to hover, automobiles require a working engine to maintain power brakes and for both, electrical (or other) power is required to communicate while starting, moving, slowing or stopped. Thus, operation may also encompass the proper control and functioning of those supporting systems of the vehicle.

As used herein, operator is intended to incorporate human and non-human or combinations thereof which control and/or are in control such as by oversight of some or all aspects of a vehicle's operation, e.g., movement in one or more dimensions. Operator is further intended to incorporate one or more partially or entirely automated or autonomous system or device in partial or total control of a vehicle's operation. In particular, with remote location control of the vehicle by an operator (e.g. flying a drone), the invention described herein will find considerable utility in ensuring safe and reliable communications between the operator (whether human, non-human or a combination of the two) which helps to ensure safe and reliable operation of the vehicle.

As just one pertinent example of an operator, when line of sight communication is used by a remotely located human operator to control vehicle operation, the instant invention can help to ensure that the vehicle is always in communications with the human operator and vice versa. The invention will help to prevent the vehicle from moving to a position where communications are impaired by an obstacle. If for some reason the vehicle moves to a position where communication are impaired, the situation is recognized by the invention and that information may be utilized to provide safer communications. Such safer operation may obtained for example by a non-human operator moving the vehicle to a location such as a higher altitude or to the outside of a building, or changing communications such as using different communications channels or technologies, thereby improving communications. Thus operator, as in this example, is not mutually exclusive as to human and non-human operators of the same vehicle.

The improving of communications may take place by the operator controlling a vehicle or operator (or user) controlling a communications device in response to the operator's (or user's) receipt of the communications information such as about to be impaired, impaired, about to be improved or other alert, prewarning, warning, confirmation or the like of communications impairment or absence thereof. Alternatively, the action to improve communications may take place without operator (or user) involvement such as by a backup operation or other automatic, semiautomatic or completely autonomous action or operation of or by the communications device or vehicle which action or operation will be useful to (hopefully quickly) restore operations in the event of impairment or loss of communications.

In particular, as contrasted with a user who upon unexpectedly losing radio communications switches to another radio in an attempt to restore communications, the invention may be configured to provide useful information about the impairment and may be configured to predict the upcoming impairment. This information will assist the user in, or facilitate taking correct action(s) to, prevent and/or remove the impairment. The invention may also be configured to suggest and/or take corrective action. For example, if a remotely controlled drone is allowed to fly, or is blown by wind, toward or into a location where radio communications is likely to be impaired, that possible or actual impairment event may be determined by the instant invention. For example, the prediction the impairment may be made utilizing the current position of the drone as well as its trajectory, in order to predict its upcoming path. The path is checked against location(s) having potential communications problems such as caused by obstructions. If the projected path of the drone passes through such an area of potential communications impairment, an alert may be provided to the operator.

In a situation where the drone communications are lost or impaired, its present location can be checked against locations which are known to suffer from impairment, or its current location can be checked against obstacle locations to determine if an obstacle could be causing the impairment. The probably or actual reason for the impairment may then be made available to the drone operator. Corrective action to improve communications may be suggested to the operator. For example, the operator may be advised to relocate the drone out of the affected area by climbing or taking the shortest path out.

Alternatively, if the communications impairment causes the drone's location device to fail, the last known location, along with the drone's trajectory at that and/or later time(s) can be utilized to estimate the drone's current location and that location checked and a corrective suggestion given to the operator as above. An additional capability which may be utilized includes using the drone's current location and trajectory to project its expected (upcoming) path which can then be checked against obstacles. If an obstacle in the path could cause a future impairment an alert and/or corrective suggestion can be given to the operator as above. Further, locations which may or do cause impairment, and in particular those which were previously unknown, can be stored in a database or otherwise utilized for detecting impairments in future travel.

In summary, in the instances above, an electronic map, database or a listing of known, suspected or possible impaired communications locations and/or obstacle locations can be used in the determination. If it is found that the drone is approaching, or is likely in such a location, that information is preferred to be made available to the operator. Information suggesting or directing proper action to improve communications may be provided. Quick, proper and effective action may be then taken by the operator to improve or correct the situation. That information can be used to update the impairment location information. By contrast, an operator who doesn't know what caused the impairment changes to another radio which also doesn't work because the problem is the location and not the radio. The operator is forced to waste time and effort to troubleshoot the communications problem. The communication problem may be repeated on another trip through the same area. By comparison the above described embodiment of the instant invention quickly provides useful information to the operator, including the reason for the impairment and suggestion to facilitate quickly restoring communications. This is a significant improvement over the prior art.

Refer again to FIG. 1 for purposes of explanation of operation of an embodiment of the invention is given by way of example for a single pilot flying an aircraft and operating its com and nav radios. Locations in the example include altitudes. The pilot (operator) of aircraft 102*b* is flying in the location shown, on a given bearing at a known speed. From that information, the invention will calculate the flight path 110 and locate in a database or map radio devices which will be near enough to the aircraft to make communications possible (absent obstructions) in a known number of minutes or distance. The amount of flight path time or distance value over which the invention checks for radio devices may include only those which are in ahead of the aircraft but may include those behind the aircraft. Each amount of time or distance, for those ahead and those behind if desired, may be known to the pilot, such as one or more of a preset value, a value adjustable by the pilot, a value dependent on the aircraft's ground speed, a value responsive to the type(s) of the potential obstruction(s) and a value responsive to the number of potential obstructions found.

In the present example, the invention will identify radio devices ahead at the BLU (104*e*) and GOO (104*f*) airports and may also identify those behind, such as 104*a, b, d* and 106. The radio frequencies of those radio devices (or just ones. or types on in direction(s) which the pilot may desire or wish to communicate with) are determined from a map or database by the invention. Desired information for one or more of those radio devices will be made available, including provided to the pilot, in various formats, as will be explained in detail by example further below. In response to the locations of the identified radio devices, location of any potential obstructions and/or areas of communications impairment near the flight path, which are stored in a database and/or map, and flight path 110 the invention finds any obstructions and/or areas of impairment which are in the area of that flight path 110 that may impair communications with those radio devices.

In this example, the invention determines there is a current communications obstructions 108*a* affecting communications with VOR 106 and how long that will continue. The invention also determines the flight path will put the mountain 108*c* in the aircraft radio device communications line of sight first with radio devices at airport 104*f* and later with radio devices at airport 104*e* and determines when and how long that will continue. When and how long may be determined in amounts of time or distance which amounts may be set or adjusted as described above. In other words, the current and projected locations of the aircraft along the projected flight path 110, locations of the mountains 108*a* and 108*c*, as well as locations of the radio devices, are utilized to determine whether or not each obstruction (e.g. mountain) is or will be in the line of sight communications path to, or otherwise will potentially cause communications impairment with, each of the above identified radio devices as the aircraft flies in the vicinity thereof. The locations are determined using information from the aircraft GPS and/or other flight instruments, an airport radio device database or map showing radio devices and an obstruction database of map showing obstructions. These maps and databases may be individual or combined in various manners, including into a single map or database as desired to practice a particular embodiment of the invention.

Continuing the example, the invention will be seen to be useful for any vehicle, that is to determine and makes obstruction information available, for example to the vehicle operator (in the example the pilot). The invention may also suggest to the operator an action to prevent the impairment, (such as to increase altitude) to reduce or remove the effect of the obstruction or take a different path (toward the airport or other destination). The information may also include when and for how long the obstruction may start and continue to impair communications and make that information available in any useful format, such as one or more of location, time or distance, taking into account the locations of the obstruction(s) and radio devices which are or will be within possible communications range, as well as the heading, location and speed of the vehicle. The invention may also check parameters of the radio station and vehicle radio (for example such as frequency, transmit power, receiver sensitivity, antenna orientation and the like).

The above determinations are preferred to be updated or determined again as the vehicle travels. Such update or determination may be made whenever a parameter of the vehicle's travel changes (e.g. speed, bearing, location) or periodically. Each update, by one or more vehicle parameter or time, may be performed as with the various time or distance values set forth above. In the above example situation of an upcoming obstruction, the pilot of aircraft 102b may be advised that communications will start to be blocked by the mountains in a calculated number of minutes, in a calculated distance or at a calculated location, and similarly end in minutes, miles or location. This information is preferred to be repeatedly updated as the aircraft travels.

In particular, in addition the updates suggested above, the invention may provide updates for a single or related (for example for a given airport) radio device communications impairment, immediately before and/or after the area of communications impairment starts and ends. This may be performed by determining updates at a non-uniform rate, updates being made closer together starting 30 seconds before the impairment is projected to start, returning to slower updates after the impairment is confirmed, followed by closer together starting 30 seconds before the impairment is projected to end, again returning to slower updates after the impairment ends. Upon entering and leaving an area of impairment, the vehicle operator may be given particular advice of that event, for example a highlighted message on a moving map display, or an impaired radio device changing its normal color on the map to another color signifying impairment and then back to normal when the impairment ends.

Other starting and ending of faster updates may be utilized as desired, including other time amounts or distances. It is also preferred that updates be made whenever a significant change in vehicle location (≥1 mile horizontal or 100' altitude), bearing (≥3°) or speed (≥5%) is made. Other values may be considered significant as desired. The information obtained from the updates may be utilized to update the obstruction and/or communications device information which is stored and made available for these determinations. For example, the precise locations where impairment starts and ends can be stored which will be particularly useful for future trips via the same route, for example a flight path such as a Victor airway or a highway. The precise locations may be used to determine and update the effective size and location of an obstruction (or area of impairment) at the particular vehicle altitude and may also utilized to estimate the effective size and location for other vehicle altitudes.

Returning to the suggestion to the operator, a suggestion may be made to the pilot to climb at a suitable rate (feet per minute, feet per mile, etc.) to prevent the obstruction by ensuring that the aircraft is at an altitude above the mountain before mountain can block the line of sight from the aircraft to the radio station. Or, simply the suggestion that a certain altitude is needed to overcome the obstruction may be made. If the aircraft flies into the area where the communication with the airport 104f radio station is impaired, the invention may so advise the pilot, for example by color change above, and may also provide information as to how long the impairment will (or is expected to) last for example in minutes or miles and further may advise the pilot with updates of when the impairment will end in one or more of minutes, miles or location. As another example an impairment area such as 114b (discussed below) may sweep over the impaired radio device as the aircraft progresses which gives a quick visual indication of where and when the impairment ends or will end. With the information of when and for how long the mountain 108c will impair communications, the pilot may take a suggested action, or other than that suggested. The pilot may start communications sooner than anticipated to avoid the impairment, or may elect to do nothing but wait until the impairment is over.

Combinations of various parts of the above example may also be utilized. Further, the information pertaining to when the blockage will take place may be updated as the aircraft climbs. The duration of the impairment may also be provided and updated. Of particular usefulness, the present invention may operate in conjunction with the autopilot of aircraft 102b in order to cause the autopilot to begin climbing before passing mountains 108a in order that communications between aircraft 102b and the radio at the Reno/Tahoe airport 104c will not be impaired as the aircraft passes the mountains. Such operation will be useful in preventing loss of communications, particularly if the aircraft 102b is a remotely operated drone where the pilot is located at the airport and losing communications could have a serious impact on the pilot's ability to control the aircraft.

Such communications impairment information may be communicated to a presentation device for display (including emitting sound) on any known type of audio device, display or readout, for example as a sound, text message, or graphical display using graphics, symbols, icons or combinations of text, graphics, symbols, icons, and the like. Of particular interest are moving map displays used for navigation and typically interfaced with a GPS in a vehicle, although they may also interface with other navigation technologies such as compass, inertial, radio, RADAR, LORAN and numerous others which are known to the person of ordinary skill in the art. The map (and or its database) contains information about radio devices and potential obstructions (such as terrain information and/or specific obstruction information) which may be manually or automatically updated. The information can be recalled from the map or a related map database and used by the invention to make and perform the various actions described and suggested herein, including determine impairments, create various notifications and/or warning related to impairments, make suggestions to the vehicle operator to reduce or avoid impairments. Those impairments can then be identified and shown directly on the moving map, along with desired messages, warnings, highlighting, graphics and the like, which are updated in near real time on the moving map display as the vehicle moves.

Referring again to FIG. 1, in aircraft 102a one of the Nav radios is a GPS receiver with a moving map display which for simplicity will be described as being similar to the map of FIG. 1 but may not display the calculated range 112. As the aircraft 102a travels to the west along the desired flight path 110, an aircraft icon stays in the center of the moving map (102a can be thought of as the moving map in this example) and the map itself moves from left to right at the ground speed of the aircraft 102a. Other types of moving map displays which are known may be utilized as well. The moving map display may show, and if desired highlights one or more of, the positions of the aircraft and those airports (104), navigation aids (106), mountains (108) and other obstructions to aircraft flight such as tall buildings and radio towers. The mountains may be specifically indicated, or may be shown as terrain with elevations and/or elevation contours as is known, for example particularly in aviation charts such as Sectional Charts and IFR Navigation charts. Other types of moving map charts may be utilized as well as are found suitable for use with the instant invention.

The present invention may show, on a moving map display, the line of sight from the aircraft 102a to one or more radio stations as well as to and/or beyond mountains and other actual or possible communications obstructions. For example, as shown in FIG. 1 the line of sight 114a may be displayed from the aircraft to the obstruction (mountain 108b) where it stops, or it may continue past the obstruction and in particular it is desired that it be given different colors or intensities for the clear and obstructed conditions or areas. For example, an impairment area which shows were communications with devices located therein may be or are impaired may be shown, such as area 114b of FIG. 1 (there is no radio device shown in respect to 114b). The line from the aircraft to the obstruction 114a may be omitted as desired, leaving only the obstruction area. Data such as one or more of altitudes, distances, signal strengths, quality of communications and communications impairment including messages, warnings and other desired information as described herein, may be also included on the moving map by use of text, graphics, symbols, icons, color and the like. Suggested actions to improve and/or avoid communication difficulties may also be displayed on the moving map. Such displays may be made by use of text, symbols, icons, intensity, color, and the like as are known to the person of ordinary skill in the art in navigation display technology and its field of art.

Any or all of the above information may be displayed as desired, and in addition it may be displayed repeatedly, sequentially or simultaneously or combinations thereof, including display of such information as it becomes updated. Such display may be chosen for different types and/or combinations of communications devices in the vehicle, which are or will potentially be within or near communications range of remote devices as the vehicle travels. Additionally displays of one or more of different potential obstructions of communications, communications impairment and suggested actions to reduce impairment may be provided along with or instead of the above.

For example, a moving map similar to FIG. 1 may be displayed for aircraft showing a line between the aircraft and every obstruction, the line being manually or automatically updated as the aircraft travels. Such obstructions would include for example each mountain which has the potential to block line of sight communications to selected or all ones or types of radio devices potentially within communications distance 112 of the aircraft. The area where the line would continue beyond the obstruction may be displayed at a different intensity for example as a shadow or color for example as red, or graphic, or different style for example dashed. The area (e.g. beyond the obstruction) where communications with devices located therein may be impaired may also be shown. For example, in FIG. 1, one line 114a showing the line of sight communications path from aircraft 102a to one obstruction 108b is shown. The area blocked by 108b where communications may be impaired for devices located therein shown as 114b (although no such devices are shown). The display may be updated upon command of the pilot. The display may be updated automatically such that as the aircraft travels along the path 110, the line 114a and area 114b would rotate clockwise, smoothly or in steps, around the obstruction 108b.

It will be understood that while area 114b has heretofore been simply described and is shown as being relatively uniform, in reality for many obstruction locations it will likely be a complex polygon, particularly in mountainous terrain where the relative locations (including altitudes) of the vehicle, obstruction(s) and remote communications devices are taken into account. Additionally, many obstructions have different effects on communications signals of different frequencies, and there may be several shapes and types of obstructions. To realize this one only has to consider the many different shapes of mountains and plateaus which have the possibility of being an obstruction to communications at some frequency and at some location.

Wireless communications effects from various obstructions are complex, and not as simple as blocking line of sight communications which has been described above. It will be known from the present teachings that obstructions may create or cause complex effects on wireless communications including reflections, Fresnel zones and diffraction, such as knife edge diffraction to mention just a few. These complex effects take place for example at various radio frequencies throughout the range of radio frequencies suitable for communications as described herein. Simply stated, some of these effects can cause what might be described as a bending of the communications energy. For example, at some frequencies, even though the direct or line of sight path between a transmitter and receiver is blocked, some energy from the transmitter can reach the receiver via the open space visible to both communications devices. If plotted graphically, this can have the appearance of the transmitted energy being bent over the obstruction. These effects and others known to the person of ordinary skill in the art can be taken into account in the implementation of the instant invention for determining communications impairment. Simply stated, a remote communications device located the area behind and below a mountain peak which blocks line of sight from the perspective of a vehicle communications device (and vice versa), can be determined by the invention to be available for communications without significant impairment.

Figure 2:
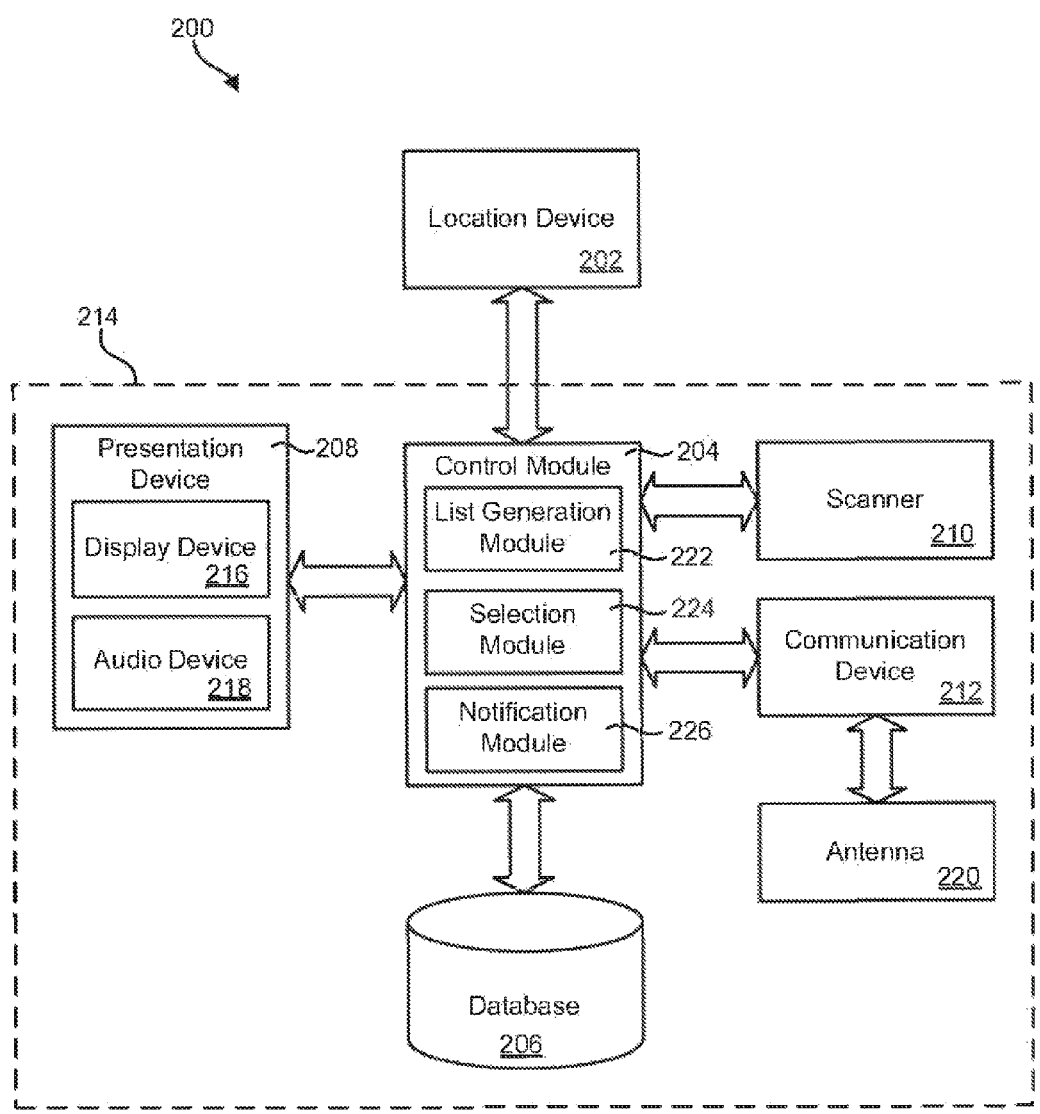
FIG. 2 is a high-level block diagram of one example of an apparatus in accordance with the invention.

Referring now to FIG. 2, in selected examples of the preferred embodiment, an apparatus 200 in accordance with the invention may include various components. It is noted at the start that the components may be collocated, that is they may all be physically located together, e.g. in the same enclosure, nearby e.g. in the same vehicle, remotely, e.g. at a remote location as compared to a vehicle, or may not even all have physical embodiments with identifiable locations, e.g. as in a software defined system such as for example the cloud. Components may be located in combinations of locations including some with physical locations and non-hardware without identifiable physical locations. By way of example, the preferred embodiment apparatus 200 will be described herein as having collocated components as further described herein, for example such as all components being located in a vehicle, it being understood that colocation is not a requirement for practicing the invention.

The apparatus 200 may include all of the illustrated components, or fewer or additional components as needed and desired. In certain examples, an apparatus 200 in accordance with the invention may include a location device 202, a control module 204, a database 206, and a presentation device 208. The apparatus 200 may also, in certain examples, include a scanner 210 and a communication device 212 which for traditional radio frequency communications may be connected to an antenna 220 which is located in, in close proximity to, or remotely from the communications device 212.

It will be understood that the preferred embodiment is described in respect to a radio frequency communications device 212 for example such as a common wireless communications receiver or transceiver, however other types of communications devices may be utilized for 212 such as optical, magnetic and quantum communications devices and other devices which operate based on quantum physics may also be utilized. Further, while the preferred embodiment communications device 212 generally contemplates and is in many respects herein described in respect to wireless communications, 212 is not so limited. The invention will find use in respect to wired and combinations of wired and wireless communications devices.

The components described in FIG. 2 may be grouped together in any suitable manner to provide the function and stated purpose of the invention. For example, each of the components 204, 206, 208, 210, 212 may be included in a radio transceiver 214 whereas the location device 202 may be embodied as a separate device. In other embodiments 202 may be incorporated in a radio transceiver 214. In other examples, the components may be combined or grouped together such that they are integrated or distributed across different pieces of equipment. All combinations or groupings which achieve the stated purpose and functionally of the invention are intended to be within the scope of the invention. Accordingly, in selected examples, several components may be combined into a single component or individual components may be broken down into several components. In other examples, the functionality of the components may be isolated or overlap with other components, including being shared or combined with components of separate devices. Each of the components may be implemented in hardware, software, firmware, or combinations thereof. With advancements in integrated circuit technology it is envisioned that the invention described herein, configured for a particular use in or with a particular communications device with characteristics considered to be useful and commercially desirable, may be implemented in one or more IP cores or one or more integrated circuits or the cloud.

In certain examples, a location device 202 may be used to detect or otherwise obtain the current location of a vehicle with which the instant invention is used. Location device 202 and may include, for example one or more of: a GPS receiver, or a LORAN, VOR, ADF, VORTAC, RADAR, LIDAR, ILS navigation system or receive location from remotely located tracking systems e.g. RADAR. Communication or determination of location may be performed directly in the vehicle or remotely communicated to the vehicle. For example, location information may be sent from aircraft GPS receivers to ground stations, satellites and other aircraft via Automatic Dependent Surveillance-Broadcast (ADS-B) system which collects various information. The collected information includes e.g. aircraft location information from numerous aircraft GPS receivers as well as from some ground based RADAR stations, weather information and various notifications.

The ADS-B collected information is broadcast back to all aircraft from ground stations and satellites, thus allowing the receiving aircraft to have local weather information as well as locations of nearby aircraft. Aircraft can also trade information directly with other aircraft. The location device 202 may also, in certain examples, include inertial, including one or more of Micro-Electro-Mechanical Systems (MEMS which can calculate the vehicle's position from its acceleration in various axes), mechanical, piezoelectric and laser gyroscope (which can calculate the vehicle's position using apparent light path distance changes caused by movement), based position-determining devices, or use technologies such as Decca, Omega, celestial observation, compasses, or the like. Other devices and technologies which may be utilized for 202 will be suggested or known to the person of ordinary skill in the art from the teachings herein.

A control module 204 may receive the current location information from the location device 202 and retrieve, from database 206, those records associated with radio devices that are within the communication range of the vehicle generically referred to as 102a (FIG. 1) which will be understood is not limited to aircraft. The retrieval thus may inherently take into account some or all records (e.g. those affecting communications range described above). In certain examples, the control module 204 may separately retrieve from 206 individual record(s) such as (nominal) range associated with the radio device and record(s) associated with one or more obstructions, such as mountains, buildings, or the like, areas of communications impairment and the like, that may affect communication between the vehicle 102a and radio devices, especially those radio devices which are remotely located such as those near the outer (nominal) range or near an obstruction. In particular, such records may also be retrieved for an entire area which is potentially within communications range associated with one or more communication devices 212.

It will be understood that for some applications the database 206 may also access information from a map, in particular a map database in a moving map display. Such information will be useful to the invention, for example in determining AGL (above ground level) altitude in aircraft which do not have a location device which provides that information. Pressure type aircraft altimeters are designed to display MSL altitude, that is the altitude above sea level. They do not provide ground elevation unless the aircraft is on the ground. AGL is provided with most, if not all, aviation type GPS radios. The desirable information in the moving map database may be shared with the database 206, assessable to the control module 204, copied to or otherwise stored in the database 206 or otherwise made available.

The use of ground elevation is useful to determine if a slow flying aircraft is airborne and to determine if radio stations in the database which are in range of the aircraft are otherwise not needed for communications. The aircraft altitude may be compared against the ground elevation at the aircraft's location to determine if the aircraft is, or is about to be, on the ground or airborne. This will be particularly useful for slow moving aircraft such as slow fixed wing aircraft flying into a headwind, lighter than air crafts e.g.

balloons, blimps, dirigibles and various rotary wing aircraft e.g. helicopters. Such aircraft are capable of flying at slow airspeeds and thus whether the aircraft is airborne is not known from its speed. Knowing if these slow aircraft are at or near ground level is highly desirable in determining if they can or need to communicate with various radio devices. For example, VOR signals are often not usable at altitudes within a few hundred feet of the ground. And, there is usually no need for an aircraft to talk to an airport ground control or the fuel truck radio when flying. Accordingly, using a vehicle altitude above ground level, or AGL, is useful in determining if radio stations which are otherwise in range due to distance are not suitable or desirable for communications.

One or more of these radio device records or types of these records in database 206 (as well as others therein) may be updated manually or automatically as described above, and additionally may be updated based on the operations of 204 described herein, e.g. determining what obstructions or areas of impairment affect communications when the vehicle is at particular locations. Radio device records in database 206 are preferred to be updated periodically, either manually such as by loading new database files from memory devices or wirelessly connected portable computer, or automatically such as in response to subscription or other service which is wirelessly connected, or in any other desired manner Individual radio device records or types of records may be updated in relatively fast fashion, including those for moving radio devices such as in other aircraft.

Updates to the database 206 may for example utilize information supplied via ADS-B and related technologies such as Traffic Information Services-Broadcast (TIS-B) Flight Information Service-Broadcast (FIS-B), Next Generation Air Transportation System (NexGen), or other technologies as will be suggested to, known or come to be known in the future to the person of ordinary skill in the art from the teachings herein. Further, database 206 may also include data related to the aforementioned predictions of communications impairment e.g. scheduled and unexpected out of service conditions for one or more communications devices, actual and predicted thunderstorms, sunspots and solar flares affecting geographic areas. In particular, it will be appreciated that some or all of the information which is desired to be stored in the database 206 may be obtained from, stored in, and/or updated from, the cloud.

Using the radio device and/or obstruction and/or impairment information retrieved from the database 206, a list generation module 222 may then generate a list, by identifier, of radio devices that are likely to be within the communication range of the vehicle 102a, or a more comprehensive list showing additional information such as corresponding frequencies, radio devices that may be in range. For the latter, the list may be augmented with further information, for example such as a notation of likely in range, possibly in range, previously found to be in range, etc. for various radio devices. In selected examples, this radio device list or portions thereof may be output to a presentation device 208 such as a display device 216 and/or audio device 218 for presentation to an operator, radio device user or occupant of the vehicle 102a. It will be understood that presentation device 208 is intended to inform and communicate to the operator using suitable sounds and images, and may also incorporate the ability for the operator to communicate to and from the control module 204 and/or other components of 200 directly or via 204 including in particular communications device 212. Thus 208 may serve as a single point of contact with the operator.

Areas of impairment may be utilized instead of individual locations of obstructions. In particular areas of obstructions create areas where communications impairment occur. Either or both may be stored and utilized to determine communications impairment. For example, instead of storing the location of all individual mountains in a mountain range, such as the Sierra Nevadas, it is known that for vehicles located in areas of lower elevations anywhere for several miles on either side of the range, communications will be blocked by the range. Thus, the area of the entire range may be stored, rather than storing every mountain in the range. Exceptions may be stored, such as those mountains with high elevations which impair communications from high vehicle altitudes and low altitude passes in the range through which communications is possible may be stored. It will be understood herein that although not specifically mentioned, with respect to determining communications impairments with respect to the location of obstacles, such discussion is meant to include the use of areas of communications impairment and exceptions. Such area may for example be expressed as an area in which a vehicle located therein is substantially unable to communicate in one or more directions, or an area of obstruction.

In certain examples, the apparatus 200 may also include a scanner 210 to scan the communication frequencies of radio devices in the radio device list. Alternatively the apparatus may include an ADS-B in (or in/out) type device or receiver in place of or along with the scanner 210 to determine the presence of radio devices, and in particular those devices in other vehicles such as aircraft, which are or may come within range. Radio devices that are not detected by the scanner 210 may then be deleted from or identified in the radio device list to show that communication with these radio devices is unlikely to be unsuccessful. Thus, the scanner 210 may be used to verify that radio devices in the list are actually within communication range of the vehicle 102 and are not inoperative or blocked by an obstruction or area of impairment. Thus, the scanner 210 may be used to weed out radio devices that are within the radius 110 but are nevertheless unable to communicate with the vehicle 102. Scanning only those radio devices in the radio device list will permit faster scanning than by scanning all possible frequencies which could be in use. Additionally, when the scanner 210 verifies communications with a radio device such information can also be used to modify the radio device list as above to indicate such verification.

In certain examples, the control module 204 may also interface with a communication device 212. This may allow an operator (e.g., human, machine, etc.) to select, and thereby communicate with, a radio device in the radio device list, e.g. those known to have a high probability of successful communications when the vehicle 102a is at its present location. For example, if the radio device list identifies a voice communication channel that is within the communication range of the vehicle 102a, a selection module 224 may allow the operator to select the radio device from the list and thereby establish communication with the radio device over the appropriate communication frequency. The communication device 212 may communicate with the radio device by way of one or more antenna 220 as is known in the art.

In selected examples, a notification module 226 may be provided to notify an operator, through an audio or visual indicator, that the operator, radio user or occupant is attempting to communicate with a radio device that is out of the communication range of the vehicle 102, not detected by the scanner 210, or potentially affected by an obstruction. This can be of particular usefulness when for example aircraft 102*a* is communicating (or attempting to communicate) with aircraft 102*b* because of the quickly changing relative locations. For example, the relative location of 102*b* can be known to 102*a*, and vice versa, via communication of the coordinates from the location device 202 (e.g. a GPS receiver) in the other's aircraft, or via communication of location coordinates from an onboard anti-collision system, or an offboard anti-collision system. Such systems may include RADAR, LIDAR and other known collision avoidance and anti-collision technologies.

The communications of coordinates may be made directly or indirectly such as for example via an onboard collision warning radar, a ground radar and/or ADS-B communications. As shown in FIG. 1, and assuming aircraft 102*a* is traveling at a much faster speed than 102*b* they will be increasing their relative distance. The location of each aircraft can be frequently updated in or via the location device 202 and database 206 (or their equivalents as described herein) thus allowing a quick determination of when the aircraft 102*a* and 102*b* are about to be, or have traveled, beyond communications range. The orientations (e.g., direction of flight, altitude, distance) of the aircraft relative to the other can also be frequently updated. This information is useful when one or both aircraft is using a directional antenna. In an additional embodiment, control module 204 may determine when the two aircraft will be out of communications range and provide that information (e.g., in time or miles) via presentation device 208, or in a situation when the aircraft distance is narrowing such as if the ground speed of 102*b* is greater than that of 102*a*, when communications will be possible.

In other examples, the control module 204 may preclude a user from selecting radio devices that are not in the list or are not available, or at least notify the operator that he or she is attempting to communicate with a radio device that is out of range and/or not in the list, affected by obstructions, or is not accessible due to the altitude of the aircraft 102*a* or other problems. Such a feature may save valuable pilot time and reduce operator errors caused by misunderstanding frequency assignments, transposing numbers, misreading charts, or the like. This feature may also reduce the chance that a pilot will unintentionally attempt to communicate over legitimate frequencies that may be reserved and not normally used such as those for emergency or distress signals. This feature may also be used to ensure that selected communication frequencies are only utilized in certain areas. As just one example, in closely located municipalities, this feature may be used to ensure that an emergency vehicle is communicating with the municipality it is located in or traveling toward.

In yet other examples, the notification module 226 may be configured to notify a pilot that selecting a radio device is inappropriate in view of the aircraft's location. For example, such situations may occur if a pilot attempts to select airport ground control while in the air, or select departure control while approaching an airport, select approach control while departing or on the ground, or select a particular sector approach or departure control from the wrong sector. In some cases, the appropriateness of the radio device may depend on whether the aircraft is airborne or not, which may be determined by checking the aircraft's altitude and location against a database of terrain elevations. Similarly, the appropriateness of a sector frequency may be determined by including sector information in the database 206 along with approach and departure frequencies.

Figure 3:
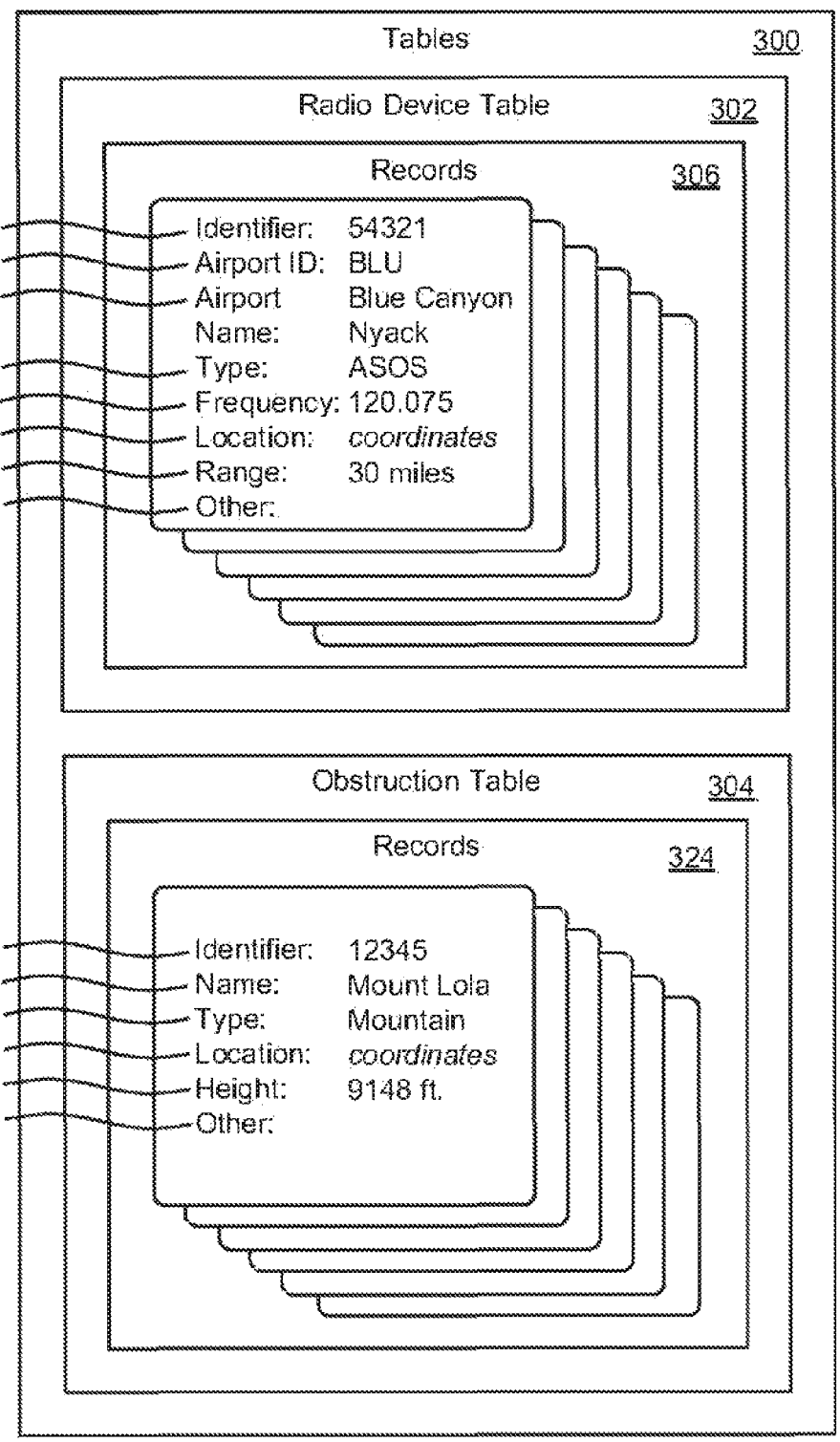
FIG. 3 is a high-level block diagram showing one contemplated example of records that may be stored in a database in accordance with the invention.

Referring to FIG. 3, as mentioned, the control module 204 may retrieve radio device and obstruction records from a database 206. In certain examples, the database 206 may store data in one or more tables 300, although other methods for storing and structuring radio device and obstruction data may be used and is within the scope of the invention, including but not limited to separate databases, maps, charts and lists. In certain examples, records in the database 206 may be automatically or manually updated as necessary (or downloaded and used as needed). For example, it is known to update GPS-based flight displays by communicating with an available radio device at particular locations to download current data. As shown, the tables 300 may, in certain examples, include a radio device table 302 and an obstruction table 304, although only one may be used or the two (or more) may be combined. Other configurations for storing and managing data utilized by control module 204 may be known to the person of ordinary skill in the art from the teachings herein.

The radio device table 302 may store radio device records 306 associated with radio devices. In selected examples, these records 306 may store various data fields to provide information about a radio device. For example, the data fields may include an identifier 308 uniquely identifying a radio device, an airport identifier 310 identifying an airport or ground station associated with a radio device, an airport name 312, a type 314 associated with the radio device, a communication frequency 316 used by the radio device, a location 318 (e.g. GPS coordinates) of the radio device, and a range 320 associated with the radio device, as well as other desired information 322. The records 306 may contain all of the data fields, or may contain more or fewer fields than those listed. For example, the data fields for the Squaw Valley VOR 106 might contain only one or more of the types call sign: SWR, frequency: 113.2, name: Squaw Valley any of which types may be used as an identifier. The data may also include the type: VOR.

In selected examples, instead of providing the range 320 as a fixed value, the range 320 may be calculated from other fields or criteria. For, example the range may be calculated by taking into account the radio device's transmitting power, communication frequency, variations in the radio device's transmitting power as a function of the time of day or day of week, the antenna type and orientation, relative elevations of transmitter and receiver, weather conditions, or the presence of sun spots. Some of this information may be stored in fields of the records 306 and may allow the range to be calculated dynamically instead of being provided as a fixed value 320.

Similarly, an obstruction table 304 may store obstruction records 324 associated with obstructions that can potentially affect communication between a vehicle 102 and a radio device. Such obstructions may include, for example, mountains, plateaus, towers, buildings, power lines, or the like. In selected examples, the obstruction records 324 may store data fields such as an identifier 326 uniquely identifying an obstruction, a name 328 associated with the obstruction, a type 330 associated with the obstruction, a location 332 of the obstruction, and a height 334 or other dimensions associated with the obstruction, as well as other information 336. As with the radio device records 306, the obstruction records 324 may contain more or fewer fields than those listed. In certain embodiments, obstructions may also be recognized by scanning where an intermittent loss of contact vs. location of the aircraft is observed. In such instances, the computed location of the obstruction and/or the location of the aircraft when contact was lost may be stored in the database 206.

Data such as that in FIG. 3 related to radio devices and obstructions may also be obtained from, shared with or otherwise made available from another device, one such example being a location device 202 which has maps and associated data for providing a moving map of terrain, airports, obstructions, altitudes, etc. Such devices are for example GPS based moving maps and flight systems utilized in aircraft and vehicles. For example, the location device 202 can provide vehicle current position including altitude, the location and altitude of airports and navigation aids, the altitudes of terrain surrounding the vehicle, airports and navigation aids (from which the presence of mountains or other potential blocking of line of sight communications can be determined), and other obstructions such as tall buildings which have the potential of blocking communications.

It will be recognized that frequently airport radios and other communications radios with which a vehicle may wish to communicate are remotely located, for example on high towers and mountains. If desired, such locations and elevations may be included in the radio device records 306, or alternatively such may be determined by control module 204 and stored for future use. Such determination may include for example noting the availability of a particular radio device as the vehicle travels in the area of the device and using triangulation or other well-known methods of determining or computing the device's location. For example, in FIG. 1, the aircraft 102b can determine the location (at some degree of accuracy) of the Squaw Valley VOR 106 by storing the aircraft's locations in the area including altitude when the signal is lost. Assume aircraft 102b flies from its present position, keeping to the west of mountain 108a and 108, to Sierraville Dearwater, at an altitude below those mountains, the signal from VOR 106 will be lost when the mountains are in the line of sight. Comparing those signal losses with the position of mountains 108, 108a and the one shown between the aircraft and the VOR 106 when the signal is lost, the location of the VOR can be triangulated.

Figure 4:
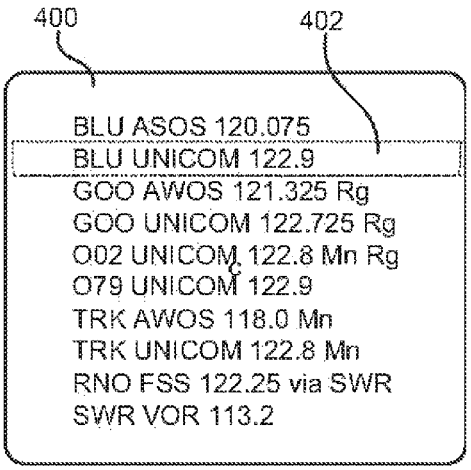
FIG. 4 illustrates one example of a display for presenting a list of radio devices to a communications device user or an occupant of a vehicle.

Referring to FIG. 4, while continuing to refer generally to FIG. 1, in selected examples, a list of radio devices within the communication range of a vehicle 102a may be presented to an operator on a display device 216, such as an LED, LCD, plasma, or CRT display. The list may show only a single identifier from a data field for each radio device, for example its call sign (e.g. SWR for VOR 106) or frequency (113.2 for 106) or more information as desired (e.g. as in FIGS. 4-6). The list may be presented alphanumerically by itself or may be superimposed over a flight-related display such as a moving map. Furthermore, the display device 216 may be integrated into a radio, navigation computer, or other device, as needed, or may be a stand-alone device. In particular, a moving map flight display may have the information of FIG. 4 superimposed on it with that information located at or near the radio device on the map.

When the aircraft 102a illustrated in FIG. 1 comes within communication range of certain airports 104a-f, ground stations 106, or the like, the control module 204 may retrieve the appropriate radio device records 306 from the database 206 and present a list to the pilot. For example, a list similar to that illustrated in FIG. 4 may be displayed on the pilot's radio or navigation computer. Or, as above, a moving map flight display may have the information of FIG. 4 superimposed on it with that information located at or near the radio device on the map. Further, when the actual radio device is located remotely from the facility which communicates by the device, for example when an airport communications radio is remotely located on a mountain, the display of information may be located on or near the facility rather than the actual location of the remote radio device.

In this example, BLU, GOO, 002, 079, TRK and RNO are codes or identifiers associated with the Blue Canyon Nyack, Nevada County, Nervino, Sierraville Dearwater, Truckee, and Reno airports, respectively. ASOS and AWOS identify automated weather broadcasts located at the airports that are listed. UNICOM identifies voice communication channels at the airports that are listed. FSS identifies a flight service station, a manned Federal Aviation Administration service to aid pilots in safe flying and navigation. These flight service stations often receive communication signals on one frequency and transmit on another. VOR identifies a VHF Omnidirectional Radio Range navigation aid and SWR identifies the Squaw Valley VOR. The numeric entries (e.g. 120.075) identify communication frequencies for each of the respective radio devices in MHz. In this example, a "Mn" following the communication frequency indicates possible obstruction by mountains. A "Rg" following the communication frequency indicates that a radio device is at or near the outer limit of the aircraft's communication range.

Thus, the entries on the display 400 would have the following meanings to the pilot:

BLU ASOS 120.075 Blue Canyon Nyack airport automated weather report at 120.075 MHz BLU UNICOM 122.9 Blue Canyon Nyack airport voice communication at 122.9 MHz GOO AWOS 121.325 Rg Nevada County airport automated weather report at 121.325 MHz and near the limit of the range GOO UNICOM 122.725 Rg Nevada County airport voice communication at 122.725 MHz and near the limit of the range O02 UNICOM 122.8 Mn Rg Nervino airport voice communication
at 122.8 MHz, near the limit of the range and may be obstructed by mountains O79 UNICOM 122.9 Sierraville airport voice communication at 122.9 MHz TRK AWOS 118.0 Mn Truckee airport voice communication at 118.0 MHz and may be obstructed by mountains TRK UNICOM 122.8 Mn Truckee airport voice communications at 122.8 MHz and may be obstructed by mountains RNO FSS 122.25 via SWR Reno flight service station receives at frequency 122.25 MHz and transmits over the Squaw Valley VHF Omnidirectional Radio Range navigation aid SWR VOR 113.2 Squaw Valley VHF Omnidirectional Radio Range navigation aid transmits at 113.2 MHz It should be recognized that the format and type of information provided in FIG. 4 is presented only by way of example and is not intended to be limiting. Indeed, different types of information may be provided and the information may be arranged, grouped, or formatted in a variety of different ways. For example, the radio device frequency, although represented in MHz in this example, could also be represented by a channel number, mnemonic, or other identifier. In selected examples, the information may be completely spelled out, abbreviated, or coded. In certain examples, the type and/or format of the information may be selected to fit a particular application or the preference of an operator. As just one example, if planning to land, the pilot may prefer to have all radio services related to an airport identified in chart form and located at or near the airport on the moving map display.

Or, the pilot may prefer to have a list of available radio services which are associated with an approach and landing at Reno displayed on the communications device 212 or alternatively presentation device 208. The list can be automatically generated and displayed by the control module 204, for example in response to the aircraft position flying toward the airport and descending at a rate which will put the aircraft in position for landing. At a distance from the airport, for example 30 miles, such a list would automatically pop up on the display and might look like the one below.

RENO:
  ATIS 135.8
  Approach 126.3 (220°-035°)
  Approach 119.2 (036°-219°)
  Ctl. Tower 118.7
  Ground 121.9

The list showing radio frequencies for the ATIS (weather advisory), two approach control frequencies (one of which is used depending on which direction the pilot is approaching from), the control tower, and the ground control. These frequencies are generally required to be used in succession when landing. It is possible that only the single appropriate approach frequency is displayed based on the position and heading of the aircraft. In certain examples, the apparatus 200 may allow a user to select, and thereby communicate with, one or more radio devices in the list. Of course, as described above, the location of these devices, along with the location of the aircraft, can be checked in respect to obstructions in the obstruction database to determine if there are, or will be based on the aircraft's projected flight path, any impairments to communications with suitable indications being made on the display. This checking may be updated, periodically or substantially continuously, as the aircraft progresses. Upon automatic, or the pilot selecting a radio device, the radio device may appear as a highlighted region 402 on the display 400, or be identified by a cursor, arrow, different color text, or the like. Similarly, the operator may select a radio device from the list using a knob, buttons, scrolling device, touch screen, or the like, the likes of which are well known in the art.

As the pilot is approaching the Reno/Tahoe Airport and then landing, the ATIS frequency of the list above is first selected by the pilot which causes "ATIS" or "135.8" or both to be highlighted and the communications radio to tune to that frequency. Alternatively, that frequency may be automatically selected by control module 204 which prompts the pilot to listen to the ATIS. The pilot then receives the automated weather information from the ATIS radio. The pilot needs to have this weather information before contacting approach control, and approach control should be contacted when the aircraft is 20 miles out. Next the pilot selects the approach frequencies, if two are shown it is the one selected depending on the direction the pilot is approaching the airport from. That "Approach" or 'frequency' or both is highlighted as above and the ATIS frequency dims (similar to GOO AWOS in FIG. 5). Alternatively, the approach control frequency may be automatically selected by the control module 204 when the aircraft is a little more than 20 miles out. At 20 miles (which may be automatically signaled to the pilot by the highlighted approach control frequency changing, for example such as a different color or flashing), the pilot communicates over the radio with the air traffic controller responsible for directing air traffic in that section of airspace. The air traffic controller directs or assists the pilot in lining up with the appropriate runway for landing. When the pilot is lined up and ready to land he selects the control tower frequency which lights up, and the approach frequency dims. The pilot communicates with the control tower operator. When the pilot lands and exits the runway, he selects the ground control which similarly lights and tower dims. Ground control directs or assists the pilot in parking the aircraft.

The actual landing of an aircraft may be as simple as described above, or may be more complex, particularly for instrument landings in bad weather. The example given will nevertheless serve to explain the utility of the instant invention and in particular the ability to ensure that the vehicle operator is presented with, or otherwise is informed of, radio devices which are within communications range and in this example are appropriate for the vehicle communications throughout its travel. One of ordinary skill in the art will understand and recognize from the teachings herein, including the above example, how to practice the invention for a particular set of needs, performance, costs and other desired factors. In the example above, the radio devices were presented in the order they will likely be selected. This order was presented for the particular landing of the example but generally the order may be based on a vehicle's position, direction, speed, altitude, or the like, and may facilitate manual selection of the frequencies, or automatically select one or more frequencies (as well as one or more vehicle radios) in the order they will be needed.

In the example above when approaching and landing at an airport, the display 400 presented ATIS, approach, tower and ground radio devices in order, assuming a normal visual flight rules or VFR landing. This greatly assisted the pilot by avoiding the possibility of having to fumble through a radio menu to find the correct frequencies or the pilot selecting a wrong frequency, not getting the expected response, and then having to troubleshoot that problem. The example can be adapted to many different vehicle scenarios, such as a flying a drone (e.g. an order delivery which relies on phoning the buyer when the drone arrives), a truck, train or boat approaching a river bridge (which is unexpectedly in the wrong position for the vehicle to pass and calling the bridge operator to have the bridge moved so the vehicle can pass), a marine vessel approaching a port (calling the harbor master for docking permission and instructions), simple situation awareness (knowing where the vehicle is and obtaining broadcast or specific instructions). In all of these situations, as well as numerous others which will be known from the instant teachings, the invention assists the vehicle operator by helping to ensure communications are possible and made on the correct channel, to the correct radio device and in the correct sequence and manner.

Figure 5:
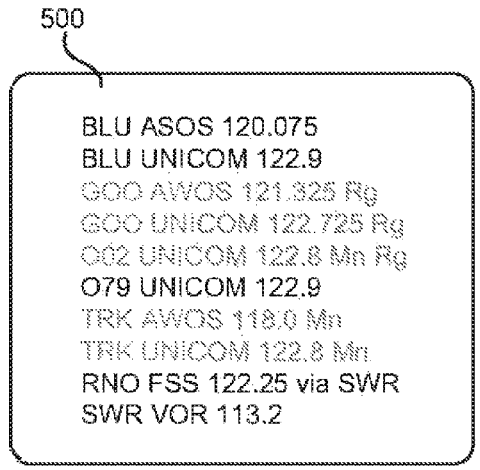
FIG. 5 illustrates another example of a display for presenting a list of radio devices to a communications device user or an occupant of a vehicle.

Referring to FIG. 5, in selected examples, a display 500 may differentiate between radio devices that are most likely within communication range, from radio devices that may be affected by an obstruction, are out of range, or are at or near the limit of the vehicle's communication range. For example, radio devices that may be obstructed by mountains or are out or near the limit of the vehicle's communication range may be displayed in a different color or with different highlighting, or be marked by an identifier such as a symbol, word, or abbreviation. This may allow a pilot to quickly differentiate between radio devices that are likely within range and those that may not be in range. Alternatively, the display 500 may differentiate between radio devices that may be technically within range (e.g., falling within a determined radius 110 and/or not obstructed), and radio devices that are actually in range as detected by a scanner.

Figure 6:
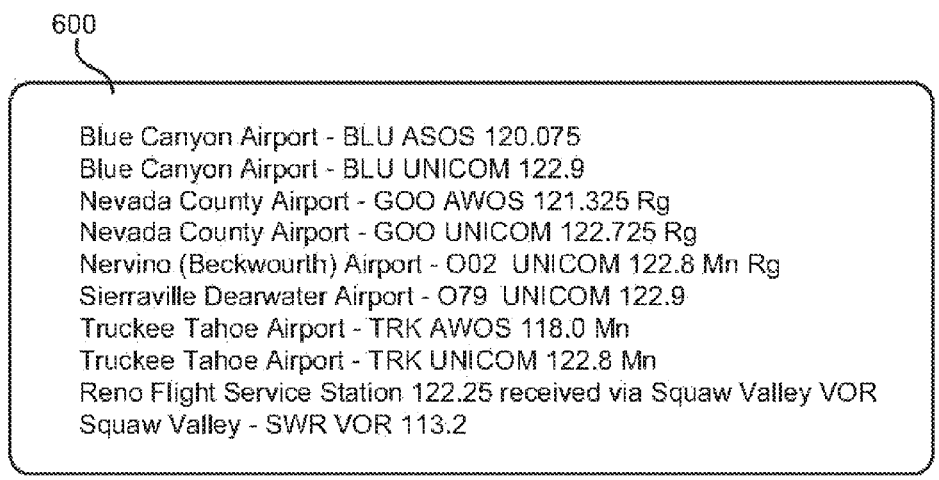
FIG. 6 illustrates yet another example of a display for presenting a list of radio devices to a communications device user or an occupant of a vehicle.

Referring to FIG. 6, as mentioned, a display 600 may, in certain examples, provide a more detailed or descriptive list of radio devices. For example, a full name of an airport or ground station may be displayed to a pilot in addition to the radio device information illustrated in FIG. 4. This may reduce the need to look up or memorize the airport or ground station codes and may provide additional readability or be helpful to a novice pilot or other vehicle operator. In some embodiments, the display is made as described in respect to FIG. 5, and if the vehicle operator desires a more verbose description the operator may select one or more of the items to cause more detail to be provided. Differing degrees of detail may also be provided as selected or directed by the operator.

In selected examples, an audio device 218 of FIG. 2 may operate in conjunction with the display devices 400, 500, 600 of FIGS. 4 through 6 to present information to an operator of a vehicle. For example, an audible indicator stating "ground control selected" may be announced over a pilot's headset or an operator's audio system along with a visual indicator stating "ground control frequency selected" which may be highlighted on the display. As another example the audio indicator may state "bridge attendant frequency selected" to the operator of a truck locomotive or boat to facilitate communications with that operator to request the bridge be moved, or verify that it is in the proper position to allow the vehicle to pass. Alternatively, simple audible sounds such as a beep or buzz may be utilized to assist the operator in communications. If desired, audible presentations may accompany or be substituted for other visual presentations of information as described herein.

Figure 7:
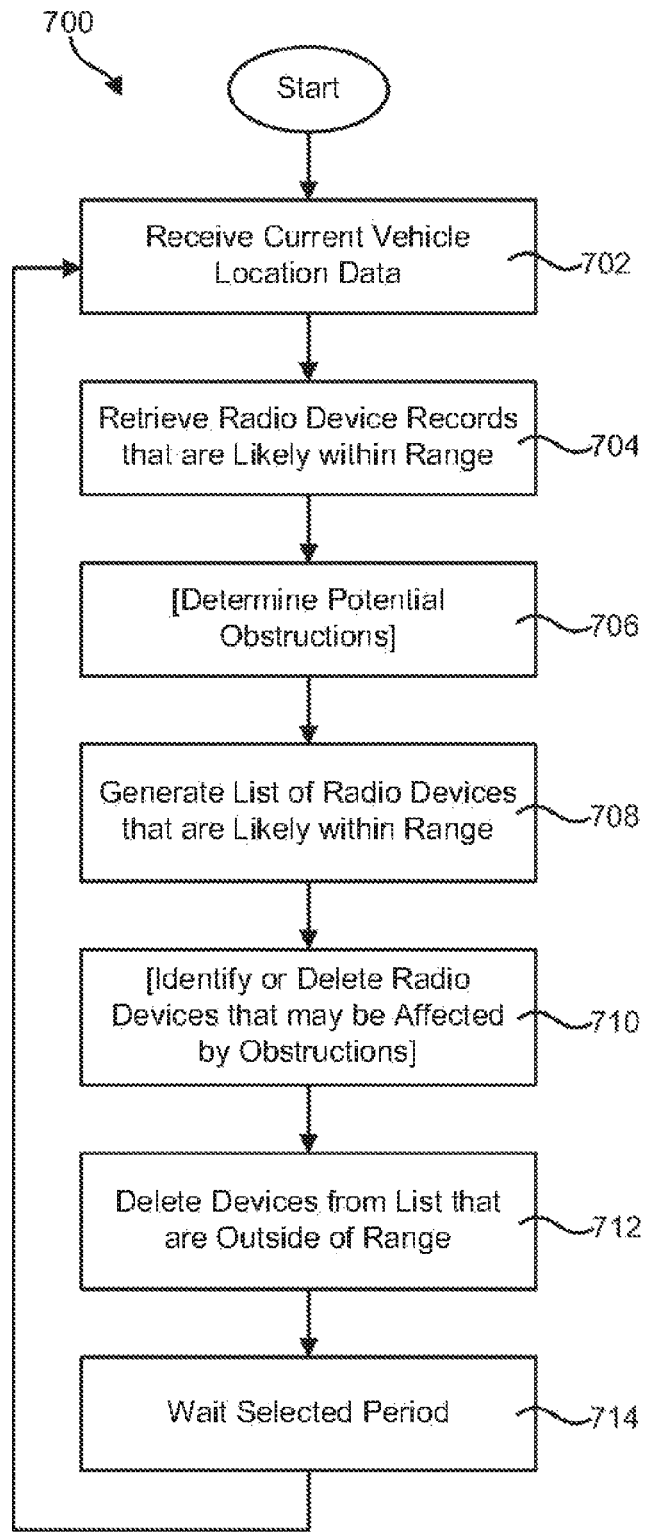
FIG. 7 illustrates one example of a method for generating and maintaining a radio device list in accordance with the invention.

Referring to FIG. 7, in selected examples, a method 700 in accordance with the invention may include initially receiving 702 a vehicle's current location. This location may be expressed in any suitable coordinate system and may include, for example, GPS coordinates, coordinates relative to another location as the location of the vehicle relative to a radio device. Radio device records corresponding to radio devices that are likely within the communication range of the vehicle may then be retrieved 704 from a database 206. This step 704 may include returning records of radio devices that are located within a determined radius 110 of the vehicle. In certain examples, the communication range of the radio devices, as stored in the radio device records 306 or calculated from data stored in the radio device records 306, may also be considered. This will ensure that not only is a radio device within the vehicle's communication range but also that the vehicle is within the radio device's communication range. Nevertheless, in selected examples, and for reasons of simplicity, it may be assumed that a vehicle and a radio device will be able to communicate with one another if the radio device is within a selected radius 110 of the vehicle 102. Such lists at any step of the method may be provided before any attempt is made to communicate with one or more listed radio stations either by a scanner, operator or user.

Once the radio device records 306 are retrieved from the database 206, the method 700 may optionally determine 706 if there are obstructions that may block or affect communication between the vehicle 102 and the radio devices. This may be performed by retrieving obstruction records 324 from the database 206. Once the radio device records are retrieved and the obstructions are determined, a list of radio devices that are likely to be within range of the vehicle 102 may be generated 708. This may include deleting 710 or identifying 710 radio devices in the list that may be affected by obstructions. This may also include deleting 712 radio devices from the list that were previously in range but are no longer in range. After waiting 714 a selected period, the process 700 may be repeated, if desired without attempting communications, to ensure that the list remains current and up-to-date. The process 700 may also be repeated upon operator request or after the vehicle travels a selected distance and/or altitude.

Figure 8:
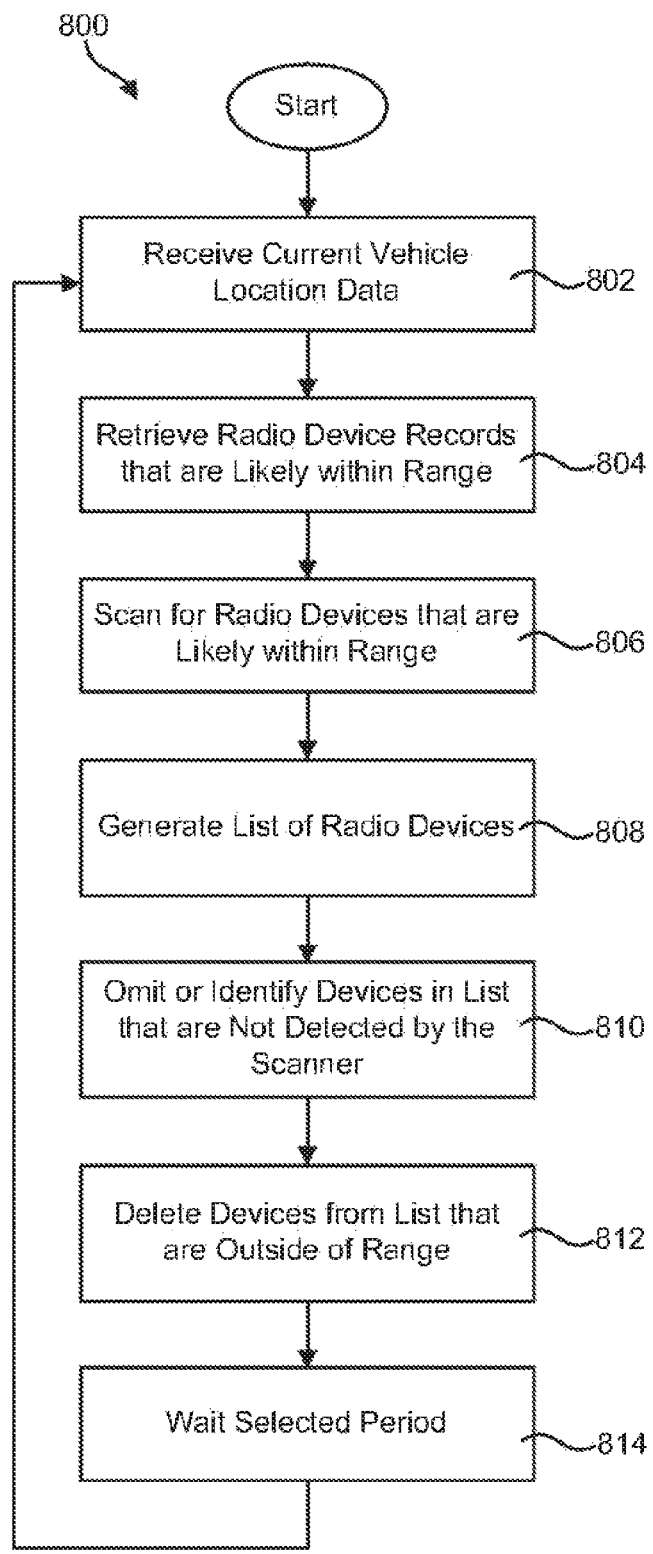
FIG. 8 illustrates another example of a method for generating and maintaining a radio device list in accordance with the invention

Referring to FIG. 8, in another example, a method 800 in accordance with the invention may include initially receiving 802 a vehicle's current location and retrieving 804, from the database 206, radio device records associated with radio devices that are likely to be within the communication range of the vehicle 102. Once these radio device records have been retrieved 804, the communication frequencies of the radio devices may be scanned 806 to determine which radio devices are actually in range. The scanning step 806 may be performed in place of or in addition to the step 706 of accounting for obstructions, as described in FIG. 7. Once the scanning is performed, a list of radio devices that are likely to be within range of the vehicle 102 may be generated 808. This may include omitting 810 or identifying 810 radio devices in the list that were not detected during the scanning step 806. This may also include deleting 812 radio devices from the list that were previously in range but are no longer in range. After waiting 814 a selected period, the process 800 may be repeated to ensure that the list remains current and up-to-date. The process 800 may also be repeated upon operator request or after the vehicle travels a selected distance.

It should be understood that apparatus and methods in accordance with the invention may be practiced with other types of vehicles, such as spacecraft, automobiles, watercraft, trucks, trains or other heavy machinery. The apparatus and methods may also be practiced with portable radios not attached to a vehicle, for example smart phones, tablets, computers and the like which communicate wirelessly with the invention facilitating or directing the user's movement to locations where communication impairments are reduced or eliminated. As another example, automotive radios may be coupled to a location device 202 and may include a database 206 of radio stations that the radio is configured to receive. The database 206 may store radio station records which may include a unique name or identifier, a type (e.g., AM, FM, TV, Satellite, NOAA weather, public service, etc.), a format (e.g., police, fire, animal control, country, rock, classic, talk, shopping, news, etc.), a communication frequency, transmitting power including variations in transmitting power as a function of time or day, and location. The database 206 may also store records associated with potential obstructions, which records may be updated or appended in response to attempts to communicate with particular radio devices from particular locations. The radio may then use the current position information and the database records to provide a list of radio stations that are likely within range of the automobile or other vehicle or user. Such list may be provided before any attempt is made to communicate with one or more listed radio stations.

For example, the vehicle or user radio may present one set of radio stations when an automobile or user is on one side of a mountain range and present a second set of radio stations when the automobile or user is on an opposite side of the mountain range. Similarly, the first and second sets may be displayed when the automobile or user is at or near the top of the mountain range, since both sets of stations may be in range. As another example, as an automobile or user travels from one city to another, the radio may be configured to display stations from an originating city before reaching a midpoint between the two cities, and display stations from a destination city after passing the midpoint between the two cities. Again, such list(s) may be provided before any attempt is made to communicate with one or more listed radio stations.

The invention may be embodied in other specific forms without departing from its spirit or essential characteristics. The described examples are to be considered in all respects only as illustrative and not restrictive. The scope of the invention is, therefore, indicated by the scope of the appended claims as properly interpreted without being divorced from the specification, in further view of the teachings specification. All changes which come within the meaning and range of equivalency of the claims are to be embraced within their scope.

As explained above, embodiments of the system and method described herein provide a way to present a list of radio devices to an occupant of a vehicle and if desired to do so without first attempting communications with one or more radio devices on the list. Various tasks or modules described herein may be implemented using a central processing unit (CPU), a graphics processing unit (GPU), a microprocessor, or the like. The microprocessor may be a specialized or dedicated microprocessor configured to perform tasks by executing machine-readable software code that defines the tasks. The microprocessor also may be configured to operate and communicate with other devices such as direct memory access modules, memory storage devices, internet-related hardware, and other devices configured to transmit data. Software code may be configured using software formats such as Java, C++, XML (Extensible Mark-up Language), or the like to define functions required to carry out the functional operations described herein. The code may be written in different forms and styles, the likes of which are known to those skilled in the art. Different code formats, code configurations, styles, and forms of software programs may be implemented. The invention may be embodied in one or more IP cores and may be embodied in one or more integrated circuits.

Where a computer is used to implement the present invention, different types of memory devices may be used to store or retrieve information while performing some or all of the functions described herein. In some embodiments, the memory/storage device may be a separate device that is external to the processor, or may be incorporated into a monolithic device, where the memory or storage device is located on the same integrated circuit, such as components connected on a single substrate. Cache memory devices are often included in computers for use by a CPU or GPU as a convenient storage location for information that is frequently stored and retrieved. Cloud technology including one or more of storage, processing, computing and platform(s) may also be utilize to implement part or all of the invention.

Similarly, persistent memory may be used by a computer to store information that is frequently retrieved by a CPU, but is not often altered. Main memory may be used to store and retrieve larger amounts of information such as data and software applications configured to perform certain functions when executed by a CPU. These memory devices may be configured as random access memory (RAM), static random access memory (SRAM), dynamic random access memory (DRAM), flash memory, and other memory storage devices accessible by a CPU to store and retrieve information.

Embodiments of the invention may be implemented using memory and storage devices, as well as any suitable protocol for storing and retrieving information in these memory devices. Although the operations or steps of the methods 700, 800 are shown and described in a particular order, the order may be altered such that certain operations or steps are performed in an inverse order and such that selected steps or operations are performed, at least in part, concurrently with other steps or operations. It will also be appreciated that the various elements of the preferred invention including but not limited to those of FIG. 2 may be rearranged, separated and/or combined and may also be implemented and/or shared as part or portions of other components and devices. In particular, the invention may be implemented with or combined with vehicle systems including one or more of control, navigation and communications systems. While the preferred embodiment and its various specific features and enhancements have been described herein it will be appreciated that the subject matter of the preferred embodiment is not provided by way of limitation and numerous variations, modifications and alternative embodiments, will be apparent to those of ordinary skill in the field of the teachings herein.

The invention claimed is:

1. An apparatus comprising:
   a location device to identify current location of a vehicle;
   a database storing a plurality of radio device records, each radio device record identifying a radio device and a location of the radio device;
   a presentation device to present a list of radio devices to an occupant of the vehicle, the occupant selecting one of the radio devices from the list;
   one or more processors to receive the current location from the location device, the location in said database of the selected radio device, and in response to at least relative distance and direction of the vehicle and the selected radio device, as well as the presence of an obstruction which may adversely affect communications between the vehicle and the selected radio device, determine if the selected radio device is likely to be within communication range of the vehicle;
   wherein the one or more processors further causes that determination to be communicated to the occupant.

2. The apparatus of claim 1 wherein the database stores obstruction information for obstructions which may adversely affect communications between the vehicle and radio devices.

3. The apparatus of claim 1 further including a scanner operating to scan the communications frequency of the selected radio device, wherein the corresponding radio device record is updated and/or supplemented in response to the detection or failure to detect the presence of the selected radio device on its communications frequency.

4. The apparatus of claim 3 further including updating the corresponding radio device record to indicate, for the current vehicle location, the presence of the selected radio device on its communications frequency, as detected by the scanner.

5. The apparatus of claim 1 further including the one or more processors precluding the occupant from attempting communications with the selected radio device when the selected radio device is not within communications range of the vehicle.

6. The apparatus of claim 1 further including, when the selected radio device is not likely to be within communications range of the vehicle, the one or more processors causes the presentation device to inform the occupant when the selected radio device is expected to be within communications range.

7. The apparatus of claim 1 further including the current location including the vehicle AGL elevation, with the one or more processors additionally operating in response to the AGL elevation to prevent or remove a radio devices which is otherwise determined as likely to be within communications range from being the selected radio device.

8. An apparatus comprising:
a location device to identify the current location of a wireless communications device;
a database storing a plurality of radio device records, each radio device record including a plurality of data fields identifying at least a radio device and a location of the radio device;
one or more processors to receive the current location from the location device and in response to at least distance and direction of the wireless communications device's current location relative to radio device locations in said database, retrieve, from the database, one or more data fields of selected radio device records associated with radio devices likely to be within communication range of the wireless communications device, wherein the one or more processors further:
determine, in response to the wireless communications device current location, potential impairments which may affect communication with radio devices corresponding to the selected radio device records, and
in response to the potential impairments and at least one of the data fields, generate a list of radio devices which are likely to be within communications range of the wireless communications device; and
a wherein the one or more processors causes a presentation device to present the list of radio devices to a user of the wireless communications device.

9. The apparatus of claim 8 further including the presentation device notifying the user when attempting to select a radio device for communications which is inappropriate in view of the wireless communications device position.

10. The apparatus of claim 8 further including the presentation device presenting information to the user that the wireless communications device is potentially not capable of communicating with a particular radio device.

11. The apparatus of claim 8 further including the presentation device presenting information to a user that the wireless communications device communication with a particular radio device is potentially affected by an impairment.

12. The apparatus of claim 8 further including the presentation device presenting information to the user that includes a visual list of radio devices which are most likely within communications range of the wireless communications device.

13. The apparatus of claim 8 further including the presentation device presenting information to the user that includes a visual list of radio devices which may be within communications range of the wireless communications device with a visual indication associated with ones of those radio devices in the list for which communications may be impaired.

14. The apparatus of claim 8 further including the presentation device presenting information to the user that includes a visual list of radio devices which may be within communications range of the wireless communications device with a visual indication associated with ones of those radio devices in the list for which communications may be blocked by an obstruction.

15. The apparatus of claim 8 further including the presentation device visually presenting information to the user which information is superimposed over a display and includes radio devices which may be within communications range of the wireless communications device.

16. The apparatus of claim 8 further including the presentation device visually presenting information to the user which information is superimposed over a display and includes radio devices which may be within communications range of the wireless communications device with a further visual indication associated with ones of those radio devices in the list for which communications may be difficult.

17. An apparatus comprising:
a GPS device to provide current location data for the current location of a vehicle which current location data is updated as the vehicle moves;
at least one electronic processor to receive and electronically process the current location data as the vehicle moves;
a database storing a plurality of radio device records, each radio device record identifying a radio device and a location of the radio device;
the at least one processor operating in response to the current location data and the radio device records and electronically calculating potential impairments of vehicle communications to thereby identify at least one radio device in the database which is likely within communications range of the vehicle, the calculation and identification being updated in response to updated current location data;
wherein the at least one processors further causes the identified at least one radio device which is likely within communications range to be visually communicated to the occupant on an electronic display device.

18. The apparatus of claim 17 further comprising the electronic display device visually communicating the identified at least one radio device which is likely within communications range by displaying each device's identification from the corresponding radio device record.

19. The apparatus of claim 17 further comprising the electronic display device visually communicating the identified at least one radio device which is likely within communications range by displaying the device's location from the corresponding radio device record.

20. The apparatus as claimed in claim 17 further including the electronic display device visually communicating the identified at least one radio device which is likely within communications range and operating in response to the at least one processor to update the display of the at least one radio device which is likely within communications range in response to the direction and speed of travel of the communications device.

21. The apparatus as claimed in claim 17 further including the electronic display device visually communicating the identified at least one radio device which is likely within communications range as well as the estimated distance therefrom for which the at least one radio device will remain within communications range of the vehicle.

22. An electronic communications system for use with a vehicle, the communications system including:
an electronic GPS based location device including electronic circuitry to identify and update the current location of a vehicle as it moves;
an electronic radio device database including circuitry for storing a plurality of radio device records, each radio device record identifying a radio device and a location of the radio device;
an electronic database which may be the radio device database or a different database, for storing a plurality of obstruction records which may affect radio communications, each obstruction record identifying an obstruction and a location of the obstruction;

an electronic communications device including electronic circuitry communicating from the vehicle to a radio station via which a human operator may wirelessly communicate with a selected radio station which may or may not be included as a radio device in the radio database;

an electronic display device responsive to the current location of the vehicle, the plurality of radio device records and the plurality of obstruction records to display to the human operator whether or not the selected radio station is likely to be in communications range of the electronic communications device.

23. The communications system of 22 wherein if a radio device record corresponding to the selected radio station is not located in the radio database the electronic display device visually alerts the human operator.

24. The communications system of 22 wherein when the selected radio station is likely not within communications range, the electronic display device provides a visual warning to the human operator and again determines if the radio station is likely to be within communication range in response to an updated current location of the vehicle, with the visual warning being maintained until the electronic display device determines that the vehicle is in a location where the radio station is likely to be in communications range and ends the warning.

25. The communications system of 22 wherein when the selected radio station is likely not within communications range, the electronic display device provides a visual warning to the human operator and further determines and displays to the human operator the predicted amount of time until the vehicle will move to a location where radio station will likely be in communications range.

26. The communications system of 22 wherein when the selected radio station is likely within communications range, the electronic display device further determines and displays to the human operator the predicted amount of time until the vehicle will move to a location where radio station will likely not be in communications range.

27. The communications system of 22 wherein the electronic display device further determines and displays to the human operator on a map, the area around the selected radio station within which the vehicle will likely be in communications range of the selected radio station and outside of which area the vehicle will likely not be in communications range of the selected radio station.

* * * * *